US008941675B2

(12) United States Patent
Treat et al.

(10) Patent No.: US 8,941,675 B2
(45) Date of Patent: Jan. 27, 2015

(54) BACKING STORE MEMORY MANAGEMENT FOR RENDERING SCROLLABLE WEBPAGE SUBREGIONS

(75) Inventors: Adam Chester Treat, Jamaica Plain, MA (US); Eli Joshua Fidler, Toronto (CA); Antonio Gomes Araujo Netto, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 768 days.

(21) Appl. No.: 13/167,512

(22) Filed: Jun. 23, 2011

(65) Prior Publication Data

US 2012/0256949 A1 Oct. 11, 2012

Related U.S. Application Data

(60) Provisional application No. 61/472,111, filed on Apr. 5, 2011.

(51) Int. Cl.
*G06F 12/02* (2006.01)
*G06F 9/44* (2006.01)
*G09G 5/14* (2006.01)
(Continued)

(52) U.S. Cl.
CPC ............... *G06F 9/4443* (2013.01); *G09G 5/14* (2013.01); *G09G 5/346* (2013.01); *G09G 5/393* (2013.01)
USPC ............................ 345/544; 345/543; 345/684

(58) Field of Classification Search
CPC ..... G06T 15/005; G06T 1/60; G06F 12/0215; G09G 5/14
USPC ........................... 345/619, 629, 684, 543, 544
See application file for complete search history.

(56) References Cited

U.S. PATENT DOCUMENTS 6,031,989 A 2/2000 Cordell
6,546,397 B1 4/2003 Rempell
(Continued)

FOREIGN PATENT DOCUMENTS

EP 1450244 A2 8/2004
WO 2007094816 A2 8/2007

OTHER PUBLICATIONS

European Patent Office, "Extended European Search Report", issued in connection with European patent application No. 11187415.2, Jul. 3, 2012, (7 pages).

(Continued)

*Primary Examiner* — Ke Xiao
*Assistant Examiner* — Kim-Thanh T Tran
(74) *Attorney, Agent, or Firm* — Hanley, Flight & Zimmerman, LLC

(57) ABSTRACT

A device, system and method are provided for managing memory for rendering webpages and other structured documents that contain multiple regions. A backing store is created in memory for storing rendered document content. A main region of the structured document is rendered for display, divided into a set of tiles, and stored in the backing store. A subregion of the document is rendered and stored as tiles in the same backing store as well. At least a portion of the tiles for the main region and subregion intersecting with corresponding viewports are outputted to a display. When an active one of the viewports is changed and additional content of the document is to be rendered for display, tiles in the backing store used to store rendered but undisplayed data for the inactive viewport are released to store new rendered content for the active viewport.

18 Claims, 11 Drawing Sheets

(51) Int. Cl.
*G09G 5/34* (2006.01)
*G09G 5/393* (2006.01)

(56) References Cited

U.S. PATENT DOCUMENTS

| | | |
|---|---|---|
| 6,560,626 B1 | 5/2003 | Hogle et al. |
| 6,670,969 B1 | 12/2003 | Halstead, Jr. et al. |
| 6,728,960 B1 | 4/2004 | Loomans |
| 7,155,727 B2 | 12/2006 | Elving |
| 7,237,193 B1 | 6/2007 | Zaky et al. |
| 7,330,894 B2 | 2/2008 | Vallone |
| 7,831,926 B2 | 11/2010 | Rohrabaugh et al. |
| 2004/0027375 A1 | 2/2004 | Ellis et al. |
| 2004/0122971 A1 | 6/2004 | Joshi et al. |
| 2004/0135784 A1* | 7/2004 | Cohen et al. ................ 345/501 |
| 2004/0148307 A1 | 7/2004 | Rempell |
| 2004/0225965 A1 | 11/2004 | Garside et al. |
| 2004/0254913 A1 | 12/2004 | Bernstein et al. |
| 2005/0138633 A1 | 6/2005 | Barsade et al. |
| 2005/0195221 A1 | 9/2005 | Berger et al. |
| 2006/0259585 A1 | 11/2006 | Keohane et al. |
| 2006/0265662 A1 | 11/2006 | Gertzen |
| 2008/0120626 A1 | 5/2008 | Graffagnino et al. |
| 2008/0148266 A1 | 6/2008 | Caselli et al. |
| 2008/0250345 A1 | 10/2008 | Li et al. |
| 2009/0274384 A1 | 11/2009 | Jakobovits |
| 2010/0162126 A1 | 6/2010 | Donaldson et al. |
| 2010/0281402 A1* | 11/2010 | Staikos et al. ................ 715/760 |
| 2012/0254780 A1* | 10/2012 | Mouton et al. ................ 715/765 |

OTHER PUBLICATIONS

Reis et al., "Using Processes to Improve the Reliability of Browser-based Applications", 2009, [http://citeseerx.ist.psu.edu/viewdoc/download?doi=10.1.1.136.2646&rep=rep1&type=pdf].

* cited by examiner

BACKING STORE MEMORY MANAGEMENT FOR RENDERING SCROLLABLE WEBPAGE SUBREGIONS

CROSS-REFERENCE TO RELATED APPLICATIONS

This application claims priority to U.S. Provisional Application No. 61/472,111 filed on 5 Apr. 2011, the entirety of which is incorporated herein by reference.

BACKGROUND

1. Technical Field

The present application relates to the processing and storage of display data for independently scrollable subregions of a webpage.

2. Description of the Related Art

Web browser and similar applications are used to present documents, such as webpages and other HTML files, to a user via a display interface. A webpage may be larger than a viewable area of the display interface of a computing device, particularly where the computing device is provided with a small screen, as in the case of a handheld or mobile device such as a smartphone or tablet computer. To improve user experience and responsiveness of the device, only those portions of the webpage may be rendered for display onscreen. When additional portions of the webpage are requested for display, those additional portions are subsequently rendered, which may require a complete refresh and redrawing of the screen.

However, webpages may also include one or more areas that are independently scrollable with respect to other areas of the webpage. These scrollable areas also contain content that is not immediately visible when the webpage is initially rendered for display. In response to a command invoked by user input such as a scroll or zoom out command, the application may need to update the display to reveal additional content in the scrollable area.

BRIEF DESCRIPTION OF THE DRAWINGS

In drawings which illustrate by way of example only embodiments of the present application and in which like reference numerals describe similar items throughout the various figures.

DETAILED DESCRIPTION OF THE INVENTION

Figure 1:
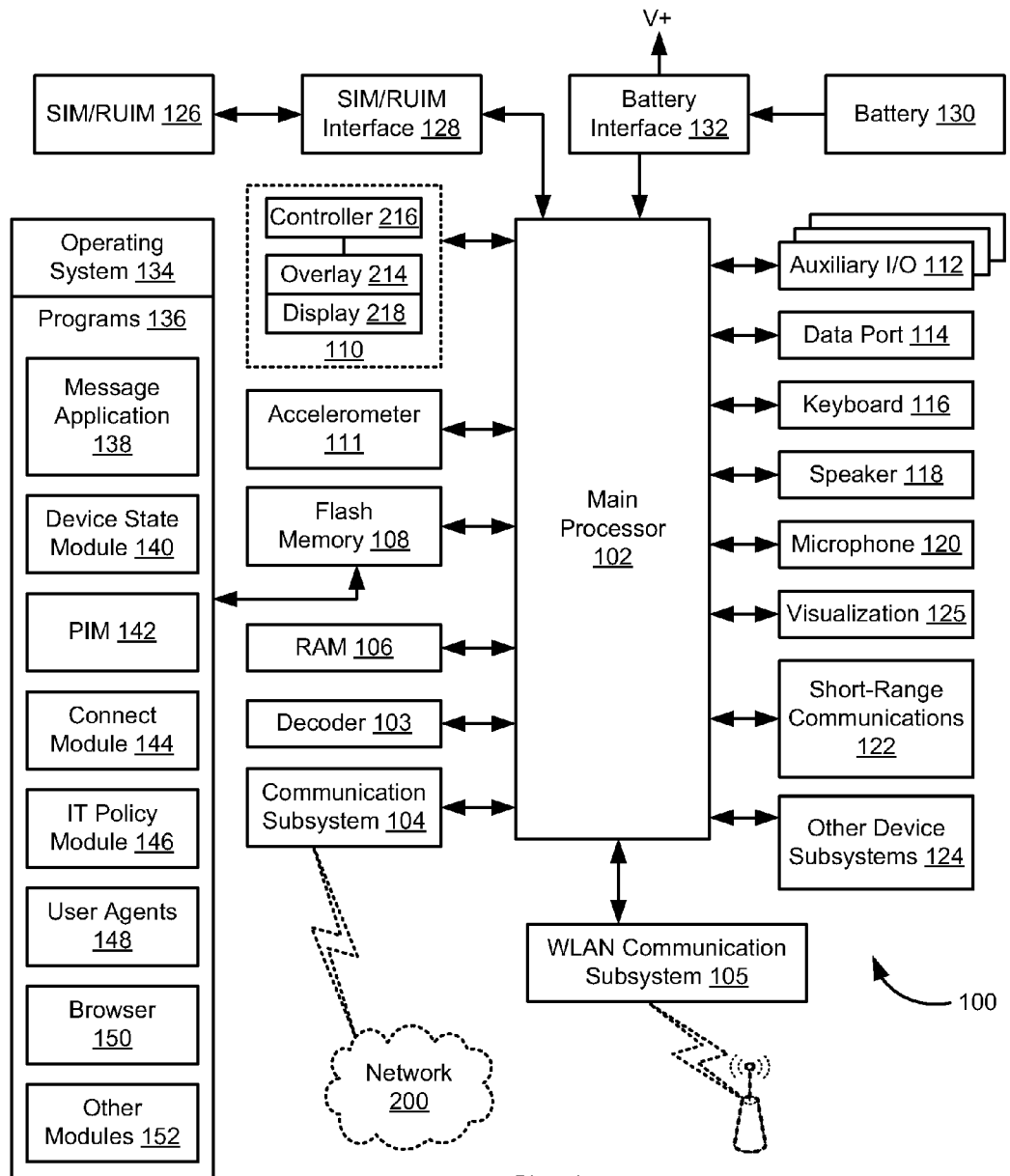
FIG. 1 is a block diagram of an embodiment of a computing device.

The embodiments herein provide improved devices, systems, methods and computer program products for rendering and displaying webpages with one or more independently scrollable subregions on a display interface.

Thus, in accordance with the embodiments described herein, there is provided a method in an electronic device for processing a structured document including at least a main region and a subregion within the main region, the method comprising creating a backing store for storing rendered content in memory of the electronic device, the backing store including an available pool of tiles for storing image data; rendering, as main rendered image data, at least a portion of the main region associated with a first viewport; storing the main rendered image data in a first subset of tiles from the available pool of image tiles in said backing store; rendering, as second rendered image data, at least a portion of the subregion associated with a second viewport; storing the second rendered image data in a second subset of tiles from the available pool of image tiles in said backing store; outputting, to a display interface, viewable portions of selected tiles from the first subset of tiles and the second subset of tiles that are within the first viewport and the second viewport; and in response to a change in the either the first viewport or the second viewport, outputting viewable portions of newly viewable tiles in the first subset of tiles or the second subset of tiles, respectively.

In one aspect, the subregion includes content that is larger than a size of the second viewport.

In a further aspect, the method further comprises allocating the first subset of tiles for storing the main rendered image data and the second subset of tiles for storing the second rendered image data. Further, if a user interface of the electronic device is interacting with the subregion, allocating the second subset of tiles for storing the second rendered image data includes allocating unused tiles from the available pool of tiles. Still further, if a user interface of the electronic device is interacting with the subregion and if the quantity of unused tiles in the available pool of tiles is lower than a number of tiles needed to store the second rendered image data, the method comprises removing ones of the first subset of tiles that are not within the first viewport; and allocating said ones of the first subset of tiles for storing the second rendered image data. In another aspect, the method further comprises maintaining ones of the first subset of tiles that are within the first viewport when allocating the second subset of tiles for the second rendered image data.

In another aspect, the main rendered image data comprises more than the first viewport associated with the structured document. In yet another aspect, the main region is scrollable relative to the viewable area of the display interface, and the method further comprises, in response to a scroll instruction associated with the main region, outputting a different newly displayed portion of the main rendered image data.

In still another aspect, creating the backing store includes an operation of allocating a fixed amount of memory of the electronic device as the backing store.

In yet another aspect, the method further comprises rendering, as third rendered image data, at least a portion of a further subregion associated with a third viewport, and storing the third rendered image data in a third subset of tiles from the available pool of image tiles in said backing store. Further, the method may also comprise maintaining at least a portion of the first subset of tiles in the backing store when storing the third rendered image data in the third subset of tiles.

In still a further aspect, the structured document is a first structured document and the subregion comprises a second structured document that is linked by the first structured document.

In another aspect, the method further comprises creating a render tree from the block-level elements in the structured document, and said operations of rendering comprise rendering block-level elements from the render tree that are associated with the main region or subregion, respectively.

There is also provided an electronic device adapted to carry out the within methods. Further, there is also provided an electronic device, comprising a display interface; memory; and a processor adapted to process a structured document including at least a main region and a subregion within the main region by: creating a backing store for storing rendered content in memory of the electronic device, the backing store including an available pool of tiles for storing image data; rendering, as main rendered image data, at least a portion of the main region associated a first viewport; storing the main rendered image data in a first subset of tiles from the available pool of image tiles in said backing store; rendering, as second rendered image data, at least a portion of the subregion associated a second viewport; storing the second rendered image data in a second subset of tiles from the available pool of image tiles in said backing store; outputting, to the display interface, viewable portions of selected tiles from the first subset of tiles and the second subset of tiles that are within the first viewport and the second viewport; and in response to a change in the either the first viewport or the second viewport, outputting viewable portions of newly viewable tiles in the first subset of tiles or the second subset of tiles, respectively.

In one aspect, the display interface comprises one of a display apparatus of the electronic device, an interface to an external display apparatus, and a touchscreen display.

In another aspect, the processor is further adapted to process the structured document by allocating the first subset of tiles for storing the main rendered image data and the second subset of tiles for storing the second rendered image data, and during said allocating, if a user interface of the electronic device is interacting with the subregion, allocating the second subset of tiles for storing the second rendered image data includes allocating unused tiles from the available pool of tiles for storing the second rendered image data.

In yet another aspect, if a user interface of the electronic device is interacting with the subregion and if the quantity of unused tiles in the available pool of tiles is lower than a number of tiles needed to store the second rendered image data, allocating unused tiles includes removing ones of the first subset of tiles that are not within the first viewport and allocating said ones of the first subset of tiles for storing the second rendered image data.

In a further aspect, the main region is scrollable relative to the viewable area of the display interface, and the processor is further adapted to process the structured document by, in response to a scroll instruction associated with the main region, outputting a different newly displayed portion of the main rendered image data.

In still a further aspect, creating the backing store comprises allocating a fixed amount of memory of the electronic device for the backing store.

There is also provided a computer readable medium, which may be non-transitory, bearing code which, when executed by an electronic device, causes said device to carry out the within methods. The computer readable medium may be provided in a computer program product.

These embodiments will be described and illustrated primarily in relation to computing devices such as communication devices that are adapted to communicate wirelessly various types of networks. It will be appreciated by those skilled in the art, however, that this description is not intended to limit the scope of the described embodiments to implementation on these particular systems or to wireless-enabled devices. For example, the embodiments described herein may be applied to any appropriate communication device or data processing device, whether or not it is adapted to communicate with another communication or data processing device over a fixed or wireless connection, whether portable or wirelessly enabled or not, whether provided with voice communication capabilities or not. The computing device can be adapted to process data and carry out operations on data in response to user commands for any number of purposes, including productivity and entertainment. Thus, the embodiments described herein may be implemented on computing devices adapted for content browsing, communication or messaging, including without limitation cellular phones, smartphones, wireless organizers, personal digital assistants, desktop computers, terminals, laptops, tablets, handheld wireless communication devices, notebook computers, ebook readers, entertainment devices such as MP3 or video players, and the like. Unless expressly stated, a computing or communication device may include any such device.

FIG. 1 is a block diagram of an example embodiment of a computing device 100 suitable for implementing various embodiments of this disclosure. The computing device 100 includes a number of components such as a main processor 102 that controls the overall operation of the computing device 100. Communication functions, including data and voice communications, are performed through a communication subsystem 104. Data received by the computing device 100 can be decompressed and decrypted by decoder 103, operating according to any suitable decompression techniques, and encryption/decryption techniques according to various standards, such as Data Encryption Standard (DES), Triple DES, or Advanced Encryption Standard (AES). Image data is typically compressed and decompressed in accordance with appropriate standards, such as JPEG, while video data is typically compressed and decompressed in accordance with appropriate standards, such as H.26x and MPEG-x series standards.

The communication subsystem 104 receives messages from and sends messages to a wireless network 200. In this example embodiment of the computing device 100, the communication subsystem 104 is configured in accordance with one or more wireless telecommunications technologies well known to persons of skill in the art of communications systems. The wireless link connecting the communication subsystem 104 with the wireless network 200 represents one or more different Radio Frequency (RF) channels, operating according to defined network communications protocols. With newer network protocols, these channels are capable of supporting both circuit switched voice communications and packet switched data communications.

The computing device 100 may be provided with additional communication subsystems, such as the wireless LAN (WLAN) communication subsystem 105 also shown in FIG. 1. The WLAN communication subsystem 105 may operate in accordance with a known network protocol such as one or more of the 802.11™ family of standards developed by IEEE. The WLAN communication subsystem 105 may be separate from, or integrated with, the communication subsystem 104 or with the short-range communications module 122. As noted above, voice communication capabilities and connectivity to voice-centric networks is not mandatory for the operation of the computing device 100 with the within embodiments. Thus, the wireless communication subsystem 104 may be omitted. If so, optionally a dongle or other peripheral device (not shown) may be connected to the computing device 100 to provide the computing device 100 with access to the wireless network 200.

The main processor 102 also interacts with additional subsystems such as a Random Access Memory (RAM) 106, a flash memory 108, a display 110, other data and memory access interfaces such as an auxiliary input/output (I/O) subsystem 112 or a data port 114, a keyboard 116, a speaker 118, a microphone 120, the short-range communications 122 and other device subsystems 124. The communication device may also be provided with an accelerometer 111, which may be used to detect gravity- or motion-induced forces and their direction. Detection of such forces applied to the computing device 100 may be processed to determine a response of the computing device 100, such as an orientation of a graphical user interface displayed on the display assembly 110 in response to a determination of the current orientation of the computing device 100.

In some embodiments, the computing device 100 may comprise a touchscreen-based device, in which the display interface 110 is a touchscreen interface that provides both a display for communicating information and presenting graphical user interfaces, as well as an input subsystem for detecting user input that may be converted to instructions for execution by the computing device 100. The touchscreen interface may be the principal user interface provided on the computing device 100, although in some embodiments, additional buttons, variously shown in the figures or a trackpad, or other input means may be provided. In one embodiment, a transmissive TFT LCD screen 218 is overlaid with a clear touch sensor assembly 214 that supports single and multi-touch actions such as tap, double-tap, tap and hold, tap and drag, scroll, press, flick, and pinch. The touchscreen display interface 110 detects these single and multi-touch actions, for example through the generation of a signal or signals in response to a touch, which may then be processed by the processor 102 or by an additional processor or processors in the computing device 100 to determine the location of the touch action, whether defined by horizontal and vertical screen position data or other position data. Touch location data may include an area of contact or a single point of contact, such as a point at or near a center of the area of contact. The touchscreen interface may be provided with separate horizontal and vertical sensors or detectors to assist in identifying the location of a touch. A signal is provided to the controller 216, shown in FIG. 1, in response to detection of a touch. The controller 216 and/or the processor 102 may detect a touch by any suitable contact member on the touch-sensitive display interface 110.

Some of the subsystems of the computing device 100 perform communication-related functions, whereas other subsystems can provide "resident" or on-device functions. By way of example, the display interface 110 and the keyboard 116 can be used for both communication-related functions, such as entering a text message for transmission over the network 200, and device-resident functions such as a calculator or task list.

A visualization processor or module 125 is included in the computing device 100. When a user specifies that a data file is to be viewed on the display interface 110, the visualization module 125 analyzes and processes the data file for visualization on the display 110. Processing data files originally optimized or prepared for visualization on large-screen displays on a portable electronic device display often requires additional processing prior to visualization on the small-screen portable electronic device displays. This additional processing may be accomplished by the visualization module 125. As will be appreciated by those of skill in the art, the visualization module can be implemented in hardware, software, or a combination thereof, and can comprise a dedicated image processor and associated circuitry, or can be implemented within main processor 102.

The computing device 100 can send and receive communication signals over the network 200 after required network registration or activation procedures have been completed. Network access is associated with a subscriber or user of the computing device 100. To identify a subscriber, the computing device 100 may require a SIM/RUIM/UICC card 126 (i.e. Subscriber Identity Module, Removable User Identity Module, Universal Integrated Circuit Card, or the like) or another suitable identity module to be inserted into a SIM/RUIM/UICC interface 128 in order to communicate with a network. The SIM/RUIM/UICC card 126 is one type of a conventional "smart card" that can be used to identify a subscriber of the computing device 100 and to personalize the computing device 100, among other things. By inserting the SIM/RUIM/UICC card 126 into the SIM/RUIM/UICC interface 128, a subscriber can access subscribed services. Services can include: web browsing and messaging such as e-mail, voice mail, Short Message Service (SMS), and Multimedia Messaging Services (MMS). More advanced services can include: point of sale, field service and sales force automation. The SIM/RUIM/UICC card 126 includes a processor and memory for storing information. Once the SIM/RUIM/UICC card 126 is inserted into the SIM/RUIM/UICC interface 128, it is coupled to the main processor 102. In order to identify the subscriber, the SIM/RUIM/UICC card 126 can include some user parameters such as an International Mobile Subscriber Identity (IMSI). An advantage of using the SIM/RUIM/UICC card 126 is that a subscriber is not necessarily bound by any single physical mobile device. The SIM/RUIM/UICC card 126 can store additional subscriber information for a mobile device as well, including datebook (or calendar) information and recent call information. Alternatively, user identification information can also be programmed into the flash memory 108.

The computing device 100 may be a battery-powered device including a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the computing device 100. Although current technology makes use of a battery, future technologies such as micro fuel cells can provide the power to the computing device 100.

The computing device 100 also includes an operating system 134 and software components 136 to 152 which are described in more detail below. The operating system 134 and the software components 136 to 152 that are executed by the main processor 102 are typically stored in a persistent store such as the flash memory 108, which can alternatively be a read-only memory (ROM) or similar storage element (not shown). Those skilled in the art will appreciate that portions of the operating system 134 and the software components 138 to 152, such as specific device applications, or parts thereof, can be temporarily loaded into a volatile store such as the RAM 106. Select other modules 152 may also be included, such as those described herein. Other software components can also be included, as is well known to those skilled in the art.

The subset of software applications 136 that control basic device operations, including data and voice communication applications, will normally be installed on the computing device 100 during its manufacture. Other software applications include a message application 138 that can be any suitable software program that allows a user of the computing device 100 to send and receive electronic messages. Various alternatives exist for the message application 138 as is well known to those skilled in the art. Messages that have been sent or received by the user are typically stored in the flash memory 108 of the computing device 100 or some other suitable storage element in the computing device 100. In at least some embodiments, some of the sent and received messages can be stored remotely from the computing device 100 such as in a data store of an associated host system with which the computing device 100 communicates.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the computing device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the network 200. PIM data items can be seamlessly integrated, synchronized, and updated via the network 200 with the mobile device subscriber's corresponding data items stored and/or associated with a host computer system. This functionality creates a mirrored host computer on the computing device 100 with respect to such items. This can be particularly advantageous when the host computer system is the mobile device subscriber's office computer system. Some or all of the data items stored at the computing device 100 may be indexed for searching on the computing device 100 either through a corresponding application, such as the PIM 142, or another suitable module. In addition, the items may be searchable using a unified search process implemented in the device operating system 134. For example, application data items can be encapsulated in a searchable entity class and registered with a unified search engine on the computing device 100 that executes searches against all registered data repositories on the device based on received queries. The search engine can also be configured to invoke a search process of external resources, such as Internet search engines or remote databases.

The computing device 100 also includes a connect module 144, and an information technology (IT) policy module 146.

The connect module 144 implements the communication protocols that are required for the computing device 100 to communicate with the wireless infrastructure and any host system with which the computing device 100 is authorized to interface.

The connect module 144 includes a set of Application Programming Interfaces (APIs) that can be integrated with the computing device 100 to allow the computing device 100 to use any number of services associated with the host system or with other systems accessible over the network 200. The connect module 144 allows the computing device 100 to establish an end-to-end secure, authenticated communication pipe with the host system. A subset of applications for which access is provided by the connect module 144 can be used to pass IT policy commands from the host system to the computing device 100. This can be done in a wireless or wired manner. These instructions can then be passed to the IT policy module 146 to modify the configuration of the computing device 100. Alternatively, in some cases, the IT policy update can also be done over a wired connection.

Other types of software applications can also be installed on the computing device 100, such as browsers 150, other user agents 148, and other modules 152. These software applications can be third party applications, which are added after the manufacture of the computing device 100. Other examples of third party applications include games, calculators, utilities, etc.

The additional applications can be loaded onto the computing device 100 through at least one of the network 200, the auxiliary I/O subsystem 112, the data port 114, the short-range communications subsystem 122, or any other suitable device subsystem 124. This flexibility in application installation increases the functionality of the computing device 100 and can provide enhanced on-device functions, communication-related functions, or both. For example, secure communication applications can enable electronic commerce functions and other such financial transactions to be performed using the computing device 100.

The data port 114 enables a subscriber to set preferences through an external device or software application and extends the capabilities of the computing device 100 by providing for information or software downloads to the computing device 100 other than through a wireless communication network. The alternate download path can, for example, be used to load an encryption key onto the computing device 100 through a direct and thus reliable and trusted connection to provide secure device communication. The data port 114 can be any suitable port that enables data communication between the computing device 100 and another computing device. The data port 114 can be a serial or a parallel port. In some instances, the data port 114 can be a USB port that includes data lines for data transfer and a supply line that can provide a charging current to charge the battery 130 of the computing device 100.

The short-range communications subsystem 122 provides for communication between the computing device 100 and different systems or devices, without the use of the network 200. For example, the subsystem 122 can include an infrared device and associated circuits and components for short-range communication. Examples of short-range communication standards include standards developed by the Infrared Data Association (IrDA), Bluetooth™, and the 802.11™ family of standards.

In use, a received signal such as a text message, an e-mail message, or web page download will be processed by the communication subsystem 104 and input to the main processor 102. The main processor 102 will then process the received signal for output to the display interface 110 or alternatively to the auxiliary I/O subsystem 112. A subscriber can also compose data items, such as e-mail messages, for example, using the keyboard 116 in conjunction with the display interface 110 and possibly the auxiliary I/O subsystem 112. The auxiliary subsystem 112 can include devices such as: a touchscreen, mouse, track ball, infrared fingerprint detector, or a roller wheel with dynamic button pressing capability. The keyboard 116 may be an alphanumeric keyboard and/or telephone-type keypad. However, other types of keyboards can also be used. A composed item can be transmitted over the wireless network 200 through the communication subsystem 104. It will be appreciated that if the display interface 110 comprises a touchscreen, then the auxiliary subsystem 112 may still comprise one or more of the devices identified above.

For voice communications, the overall operation of the computing device 100 is substantially similar, except that the received signals are output to the speaker 118, and signals for transmission are generated by the microphone 120. Alternative voice or audio I/O subsystems, such as a voice message recording subsystem, can also be implemented on the computing device 100. Although voice or audio signal output is accomplished primarily through the speaker 118, the display interface 110 can also be used to provide additional information such as the identity of a calling party, duration of a voice call, or other voice call related information.

The communication subsystem component 104 may include a receiver, transmitter, and associated components such as one or more embedded or internal antenna elements, Local Oscillators (LOs), and a processing module such as a Digital Signal Processor (DSP) in communication with the transmitter and receiver. Signals received by an antenna through the wireless network 200 are input to the receiver, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP. In a similar manner, signals to be transmitted are processed, including modulation and encoding, by the DSP, then input to the transmitter for digital-to-analog (D/A) conversion, frequency up conversion, filtering, amplification and transmission over the network 200 via an antenna. The DSP not only processes communication signals, but also provides for receiver and transmitter control, including control of gains applied to communication signals in the receiver and the transmitter. When the computing device 100 is fully operational, the transmitter is typically keyed or turned on only when it is transmitting to the wireless network 200 and is otherwise turned off to conserve resources. Similarly, the receiver is periodically turned off to conserve power until it is needed to receive signals or information (if at all) during designated time periods. Other communication subsystems, such as the WLAN communication subsystem 105 or a WPAN communication subsystem, not shown, may be provided with similar components as those described above configured for communication over the appropriate frequencies and using the appropriate protocols. The particular design of the communication subsystem 104, 105, or other communication subsystem is dependent upon the communication network 200 with which the computing device 100 is intended to operate. Thus, it should be understood that the foregoing description serves only as one example.

Figure 2:
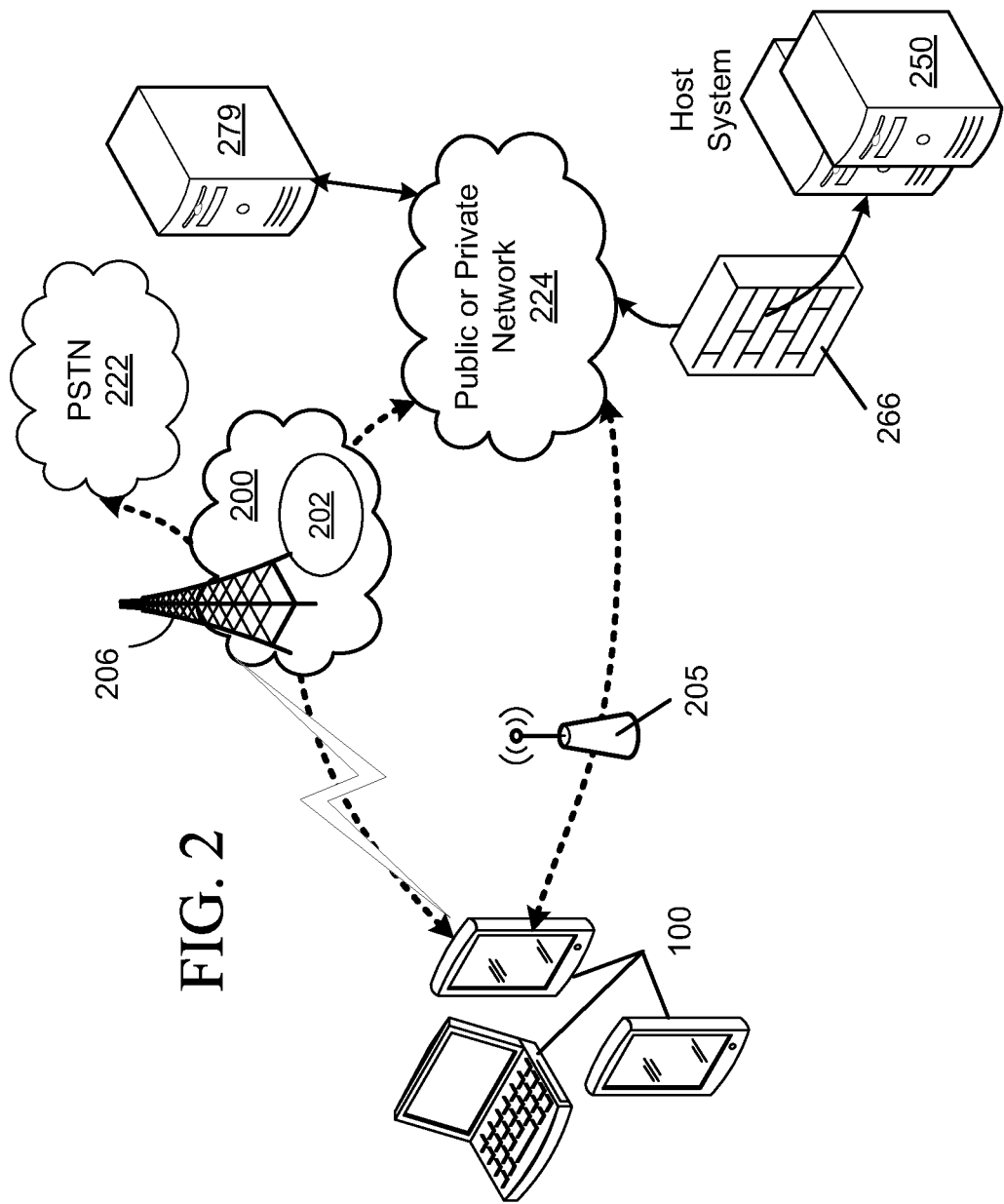
FIG. 2 is a schematic diagram of an example network topology for use with the computing device of FIG. 1.

FIG. 2 illustrates a possible network topology for the computing device 100, including paths for data and voice traffic, and including a host system 250. The host system 250 will typically be a corporate enterprise or other local area network (LAN), but can also be a home office computer or some other private or quasi-private system, for example a cloud-based and/or subscription-based Internet service. Typically, a number of communication devices 100 can communicate wirelessly with the host system 250 through one or more nodes 202 of the wireless network 200.

The host system 250 comprises a number of network components, not shown, connected to each other by a network. Within the system 250, for example, user (including administrator) computers may be situated on a LAN connection, and one or more of these desktop computers can be provided with connection facilities for loading information (e.g. PIM data, private symmetric encryption keys to facilitate secure communications) from the user computer to the computing device 100, and can be particularly useful for bulk information updates often performed in initializing the computing device 100 for use. To facilitate the operation of the computing device 100 and the wireless communication of messages and message-related data between the computing device 100 and components of the host system 250, a number of wireless communication support components are provided within the system 250 (not shown). In some implementations, the wireless communication support components can include one or more data stores, a message management server, a mobile data server, a web server, such as Hypertext Transfer Protocol (HTTP) server, a contact server, and a device manager module including an information technology policy server and editor. HTTP servers can also be located outside the host system, as indicated by the HTTP server 279 attached to the network 224. The mobile data server can also connect to the Internet or other public network through a host HTTP server or other suitable web server such as a File Transfer Protocol (FTP) server, to retrieve webpages and other data. Requests for webpages are typically routed through mobile data server and then to the host HTTP server, through suitable firewalls and other protective mechanisms. The web server then retrieves the webpage over the Internet, and returns it to mobile data server. The mobile data server is typically provided, or associated, with an encoder that permits retrieved data, such as retrieved webpages, to be decompressed and compressed, using any suitable compression technology (e.g. YK compression, JPEG, MPEG-x, H.26x and other known techniques), and encrypted (e.g. using an encryption technique such as DES, Triple DES, or AES), and then pushed to the computing device 100 via the shared network infrastructure 224 and the wireless network 200. Those skilled in the art know how to implement these various components. Other components can also be included as is well known to those skilled in the art.

The computing device 100's access to IP networks and to a public switched telephone network (PSTN), if applicable, can be provided through the wireless network 200, which comprises one or more nodes 202 configured for communication in accordance with a suitable mobile telephony standard. In turn, the wireless network 200 provides the computing device 100 with connectivity to the Internet or other public wide area network 224, and thence to the host system 250. At the same time, if the computing device 100 is a multiple-mode device, it may also communicate with the host system 250 over a LAN or WLAN, represented by the access point 205. It will be appreciated by those skilled in the art, however, that access to the host system 250 need not be limited to access via the host network (whether wireless or not). Instead, the computing device 100 may access the host system 250 over another network, such as the wide area IP network 224, via different access means, such as an access point located at the communication device user's home, or at a public or private Wi-Fi hotspot.

In this example embodiment, the computing device 100 communicates with the host system 250 through node 202 of the wireless network 200 and a shared network infrastructure 224 such as a service provider network or the public Internet. Access to the host system can be provided through one or more routers (not shown), and computing devices of the host system 250 can operate from behind a firewall or proxy server 266. A proxy server provides a secure node and a wireless internet gateway for the host system 250. The proxy server intelligently routes data to the correct destination server within the host system 250.

For some wireless networks 200 or LANs 205, the computing device 100 may be registered or activated with the respective network. A process for identifying a subscriber to a cellular network using a SIM or other identifier card 126 is described above. Other methods of registering or identifying the computing device 100 to various networks will be known to those of ordinary skill in the art. However, registration or activation may not be required for all wireless networks 200, LANs or WLANs, as some networks may allow access without prior registration or activation. The computing device 100 may also be provisioned or configured to access one or more networks. Methods of provisioning services on a computing device 100 will be generally known to those skilled in the art, but as a non-limiting example, a request for registration may be sent from the computing device 100 to a registration server of a service (not shown). If the request is approved, the registration server may transmit to the computing device 100 a service book or similar data item containing data and instructions to enable the computing device 100 to provision the service. The service book, when received at the computing device 100, may be self-executing, and permits the user to enter account information relevant to the associated service. This information is then transmitted from the computing device 100 to a provisioning server of the service provider (not shown), which then creates a service account associated with the computing device 100. Provisioning may also be carried out in compliance with the OMA DM (Open Mobile Alliance Device Management) specification version 1.2 or its predecessor or successor versions, published by the Open Mobile Alliance Ltd.

The embodiments herein will be described and illustrated primarily in relation to structured document resources such as webpages, web applications, other rich media applications, and widgets; and to user agents for processing and presenting such resources, including browser applications (browsers), such as the browser 150 identified in FIG. 1. In particular, the resources and user agents described herein may conform to known standards for the structure and presentation of content, in particular HTML4 and HTML5, published by the World Wide Web Consortium (W3C) at w3.org. In addition, the within embodiments may comply with companion, alternative, subsequent and predecessor standards and specifications, including without limitation other versions of HTML, XHTML 1.0 and 2.0, DOM Levels 1 through 3, and CSS Levels 1 through 3, also published by the World Wide Web Consortium (W3C) at w3.org. In particular, the resources contemplated herein may comprise or be associated with elements such as scripts written in JavaScript™ published by the Mozilla Foundation, Mountain View, Calif., www.mozilla.org (trademark owned by Oracle Corporation, Redwood Shores, Calif.) or in other scripting languages designed to enable programmatic access to computational objects within a host environment; Adobe Flash and Flex technologies from Adobe Systems Incorporated, San Jose, Calif.; video files in any one of various compatible formats, including Flash, Quicktime, MPEG and in particular MPEG-4; dynamic HTML technology, widgets, modules, code snippets, and the like, which may be delivered together with the resource to the computing device 100, or which alternatively may be downloadable separately by the client application, progressively downloaded, or streamed from the server for use with the resource.

Figure 3:
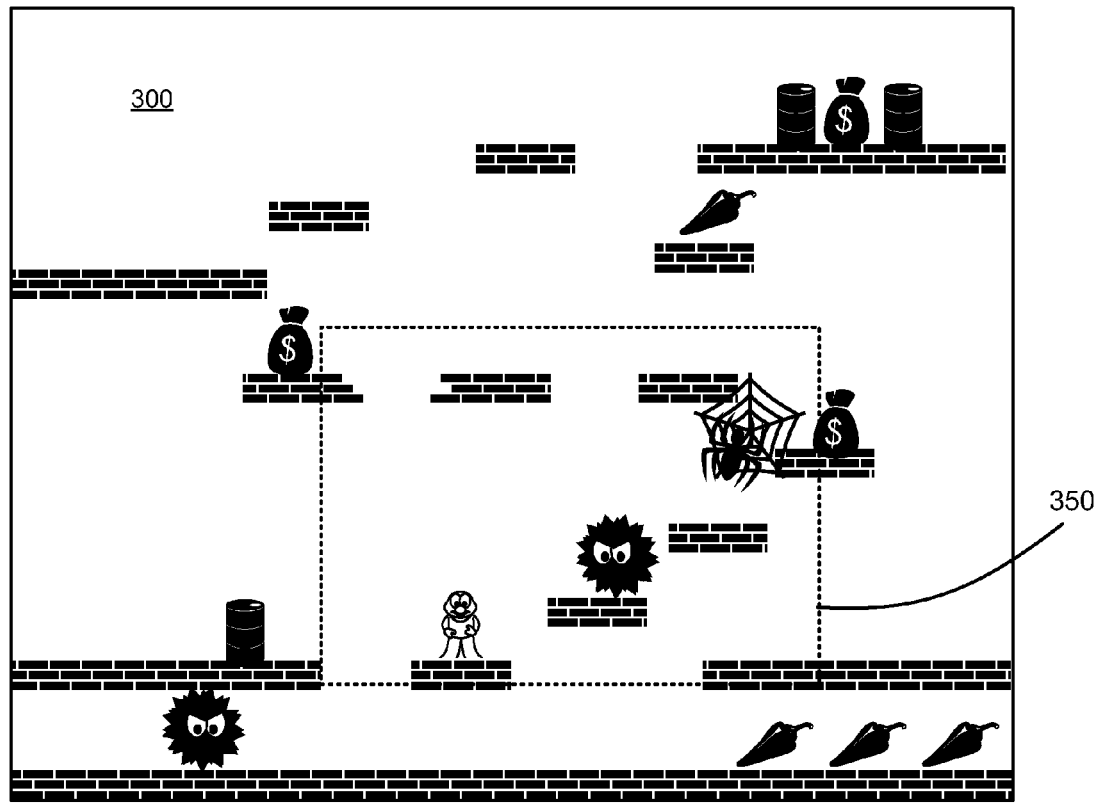
FIG. 3 is an illustration of example structured document content displayable in a display interface.

FIG. 3 is an illustration of example content 300 that is displayable on a computing device display interface 110. The content may be provided in a resource such as a structured document optionally encoded with markup, whether embedded or stored in association therewith, in accordance with a schema defining structural components (e.g. block-level elements or divisional sections) within the document. A structured document may be based on an XML-compliant, XML-like, or XML-based markup language. An example of such a document is an HTML document (such as a webpage). For ease of reference, the embodiments herein are described with reference to webpages, but it will be appreciated that strict adherence to HTML standards or to similar formats is not mandatory; these embodiments may be implemented for the purpose of rendering any suitable structured document that is capable of defining, or having defined for it, independently scrollable regions and subregions.

A webpage may comprise a number of components. The webpage may contain zero, one or more HTML elements and/or embedded objects such as text, hyperlinks, graphics, user interface elements, video, animation, and the like. Further, the webpage can comprise a number of regions or subregions, defined in accordance to HTML4+ standards or their predecessor standards. For example, as is well understood by those in the art, a simple webpage document may be defined as having a header and body section (as defined by opening and closing <head> and <body> tags within the structured document). The header section of the document typically contains document parameters and descriptions, scripts, formatting instructions, and other instructions or definitions globally applying to the document. The body typically comprises content that is processed for display to the user, in accordance with any applicable instructions or definitions contained in the header, together with other instructions or directives provided in associated files that may be provided to the computing device 100 together with the webpage document itself.

A simple webpage document of this type, without any further subregions or embedded content defined therein, may be considered to comprise only a single displayable region. This single displayable region is generated by processing the webpage document and any associated files using a layout or rendering engine, as explained briefly below. The size of the webpage available for display, once the webpage document is processed, may be defined expressly or inherently in the document or in another accompanying file (for example as "width" or "height" parameters in the HTML or as parameters in a Cascading Style Sheet or CSS document).

Where the displayable region is greater than the display interface 110 to be used to output the rendered webpage, the portion of the content that is displayed in the display interface 110 may be scrollable so as to permit a user to view other portions of the content in the display interface 110. In a typical browser application, graphical user interface elements such as scroll bars are provided although such user interface elements are not mandatory. For example, where the webpage content is displayed in a touchscreen display interface, the user may scroll through the content by actuating the touchscreen with a "swipe" or similar gesture.

The webpage may contain multiple subregions. Examples of such subregions include block-level elements such as, but not limited to images (e.g., <img> elements in HTML), tables, forms, videos, animations, canvasses, containers (e.g., <div> regions) and the like, as well as frames or other elements that may contain block-level elements (e.g., <frameset> or <iframe>). These various subregions can be defined within the body portion of a structured document such as a webpage body, and may be scrollable where the content of the subregion is defined to be greater than the viewport defined for that subregion; that is to say, the display area defined for the subregion within the document. For example, if an element in the webpage body is expressly or inherently defined with a set of given dimensions (i.e., a given length and width within the document) but the content provided for that element exceeds the boundaries defined by those dimensions, then not all the content can be displayed within those dimensions at once. Depending on the properties defined for the element, the content may be displayed anyway, thus exceeding the boundaries defined for the element; it may be clipped or hidden, in which case any content exceeding the boundaries is hidden from view; or it may be made scrollable, in which case the content exceeding the boundaries is clipped, but a user interface element such as a graphical scrollbar element is provided to permit display of the currently-hidden content. In the case of a webpage, the properties may be defined using the CSS overflow property. It will be appreciated by those skilled in the art that the subregion's content, when rendered, may be displayable over an area that is effectively greater than the dimensions of the entire document when rendered.

The body portion of the webpage (or the surrounding portion of any such structured document) may be considered to be a main or primary region (or equivalently, a main or primary frame or page), and the main region, when rendered can comprise one or more subregions. In some cases, the main region may be rendered so as to appear to consist only of one or more subregions (i.e., no content in the main region outside the subregions is visible). A subregion may also have a varying display size within the webpage, for example where the element comprising the subregion can transition between a hidden and a visible state, where in the hidden state the element is not visible at all when the webpage is outputted for display.

These subregions may optionally be visually delineated from each other and from the surrounding body, for example by borders or other graphical indicators, when the webpage is rendered for output to a display. Each of these subregions, like the main region, can be defined to be scrollable or not scrollable, and can comprise zero, one or more further HTML elements as described above. The browser 150 may retrieve and render separate HTML documents for each of the regions and subregions. Further, if scrollable, these regions and subregions may be defined to include scroll bars or otherwise be defined to receive user input for scrolling or zooming into/out of the current view of the container or frame. The content 300 of the webpage, as well as its subregions, can include content that is displayed synchronously (e.g., video content) and asynchronously (e.g., static content).

The portion of a given region or subregion of a viewable area of the document and that is currently visible, i.e., displayed via a display interface, is referred to as a viewport. Thus, a largest viewport size can be the maximum display size of the display interface, or alternatively the maximum display size of a window or other portion of the display interface area available to display the structured document. When a document (e.g., the main region) is larger than the viewable area associated with a display interface, the viewport of the main region is thus smaller than the total displayable area of the document; the viewport comprises the portion of the document that is currently displayed via the display interface. While there may be a first viewport associated with the document (i.e., the main region), a second viewport may be associated with a subregion that overlaps or is displayed within the first viewport. There may be still further viewports (e.g., third, fourth, fifth etc.) associated with other subregions that overlap or are displayed within the first or another viewport of the document. Second and subsequent viewports, being associated with subregions, may have the same size or a smaller size than the first viewport.

The general construction and composition of such structured documents and such main regions and subregions will be known to those skilled in the art. In particular, a webpage or a subregion thereof may be associated with separate files that are not rendered for direct display in the display interface 110, but are rather used to apply formatting to the main webpage content. The webpage may be linked to a cascading style sheet (CSS) file, which defines formatting for specified elements of the webpage. The CSS file is often stored as a separate document on the web server and served to the browser 150 at around the same time as the webpage itself, although formatting instructions can instead be inserted directly within the webpage code. The webpage can also include or be linked to scripts, such as JavaScript code or other code invoking APIs calling functions defined within the operating system of the computing device 100 or the browser 150.

The environments and user agents employed to render structured documents for output on the display interface 110 may be implemented using one or more of the foregoing technologies and other combinations of technologies. Further, the resources may be executed in browser, microbrowser and browser widget environments implemented using various known layout engines including, without limitation, WebKit (available at webkit.org), Gecko (Mozilla Foundation), Trident (Microsoft Corporation, Redmond, Wash.), Presto (Opera Software ASA, Oslo, Norway) and the like designed for various runtime environments including Java™ (Oracle Corporation, Redwood Shores Calif.), iOS™ (Apple Inc., Cupertino Calif.), and Windows™ (Microsoft Corporation) and BlackBerry and PlayBook OS (Research In Motion Limited, Waterloo, Canada). The relevant environment need not be restricted to a browser environment; for example, other runtime environments designed for implementation of rich media and Internet applications may be used, such as Adobe Integrated Runtime (AIR), also from Adobe Systems Incorporated. The selection and implementation of suitable existing and future structural or presentation standards, various elements, scripting or programming languages and their extensions, browser and runtime environments and the like, will be known to those of skill in the art. Further, the aforementioned browser 150 may be used to render a number of different types of files for presentation to the user. For example, other user agents may make use of the browser 150 engine to render HTML documents such as HTML-formatted email, help files, and other structured documents.

When content from a webpage or other structured document is to be viewed using the computing device on a display interface 110 (which may be integrated with, or separate from, the device itself), the computing device 100 is provided with appropriate command inputs, typically user inputs received using one of the various input subsystems provided on the device 100, such as a touchscreen display interface 110, a keyboard 116, microphone 120, or other input mechanism such as a trackball, optical joystick, button, and the like. These command inputs cause the processor to initiate the accessing of a local or remote data store (such as flash memory 108, RAM 106, or a remote web server or other content server over a network). The content (i.e., the webpage in the examples herein) is typically received by the device 100 as encoded instructions for rendering an image or other document content, such as HTML-coded content for displaying a webpage. These instructions are stored locally in memory, and may optionally be converted to different formats (for example, an HTML document may be converted to a Document Object Model (DOM) tree and/or a content tree). An application, such as a web browser, renders the instructions to display content. The rendered content can then be for display via the display interface 110.

The physical limitations of the display interface 110 and the device 100, however, can limit the amount of storage available for processing an entire webpage or other document. The content 300 illustrated in FIG. 3 may be considered, when compared to the size of a handheld mobile device's screen, to be relatively large. Regardless how the displayable size is defined, many webpages are typically conceived, designed and formatted for display on comparatively larger screens such as desktop monitors. Therefore, in many cases the content 300 is in fact greater in dimension than the displayable region of the display interface 110, particularly where the device in question is a smaller, portable device. The displayable region may be determined not only by the operational region of the display interface 110, but also by the physical form factor of the device and the fit of the device chassis around the display interface 110. For example, a bezel framing the display interface 110 may overlay the edges of the display interface 110. Thus, not all of the content 300 is necessarily viewable at a given time; only a portion of the content is viewable, as illustrated by viewable area 350. The viewable area 350 represents the amount of content displayable on a given computing device 100.

Figure 4:
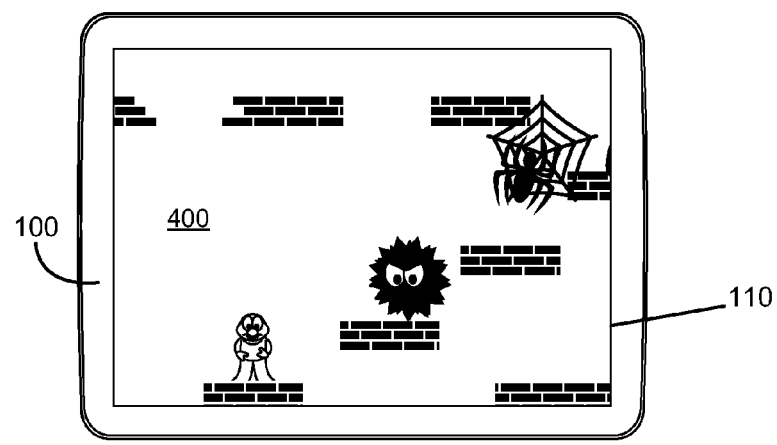
FIG. 4 is an illustration of the content of FIG. 3 displayed in a viewport in a display interface.

An example of the content 300 of FIG. 3 being displayed by a device 100's display interface 110 is shown in FIG. 4. The viewable area or viewport 350 of FIG. 3 is thus shown as view 400 in FIG. 4. As is commonly known in the art, the remaining portions of the content 300 may be rendered visible in the display 110 (i.e., the viewport 350 may be shifted to another portion of the content 300 in response to user events representing commands to scroll the displayed content (which causes the view of the content 300 to pan in a specified direction), or by zooming out (which reduces the magnification level of the content displayed, thus permitting more of the content to be displayable on the display interface 110).

The computing device 100 may receive user input instructions to scroll or zoom the displayed content by means of one or more user input devices or interfaces, including without limitation the keyboard 116, display interface 110 where it comprises a touchscreen interface, microphone 120, trackball, buttons, trackpad, scroll wheel, optical joystick, rocker switch, and the like. Several of these user input devices may be external to the computing device 100 itself; for example, a pointing device such as a mouse, trackball, tablet or touchpad may be provided as a peripheral component. In the case of a mobile device such as a smartphone or tablet computer, user input mechanisms are advantageously incorporated into the chassis of the computing device 100 itself for improved portability and mobility.

In response to a scroll or zoom command received by the device processor 102 via a user input device or interface, the processor 102 then accesses desired content 300 for rendering. To improve device responsiveness to scroll and zoom commands, a backing store may be implemented at the computing device 100 to cache content for display via the display interface 110. A schematic illustration of select components or modules of the computing device 100, including the backing store, is provided at FIG. 5. One or more applications or user agents such as the browser 510, online help application 530, and other user agents 540, are provided for execution on the device 100. These applications and agents are adapted to render structured resources such as webpages and the like. An example browser 510 may include a number of components or modules that interoperate to traverse, process and render the resource, including a user interface engine 512, a layout or rendering engine 514, and a script processor, plug-in, or virtual machine 516 for executing code snippets, scripts and the like embedded in, received with, or invoked by the resource. The layout engine 514 may be invoked by other applications on the computing device 100; this can include the messaging application 138 (not shown in FIG. 5), if that application is configured to render HTML-format email by invoking an instance of the layout engine 514. Other files may be provided on or to the computing device 100 in a structured format, and similarly may be rendered in a browser-like environment; for example, "help" files may be presented by an online help application 530, which comprises its own user interface engine but also invokes the layout engine 514 to render the files for display to the user. These various applications—the browser 510, online help 530, other user agents 540, and the messaging application 138—receive instructions resulting from detected user interface input as described above and indicated generally in FIG. 5 at 550.

Implementation of a backing store is described generally in United States Patent Application Publication No. 2010/0281402 filed on 29 Apr. 2010, "Software-based Asynchronous Tiled Backingstore", which is incorporated herein by reference. Briefly, either a non-pooled or a pooled backing store 520 may be provided for caching rendered content for display by the browser 510 or other application. The backing store 520 may be defined as having a fixed capacity, e.g. a fixed number of tiles (also referred to as records, image tiles, or buffers). Management of the backing store 520 may be implemented by the browser 510 itself, for example by a backing store process or engine 518 executing in the background of the device, advantageously whenever an instance of the layout engine 514 is invoked.

Figure 5:
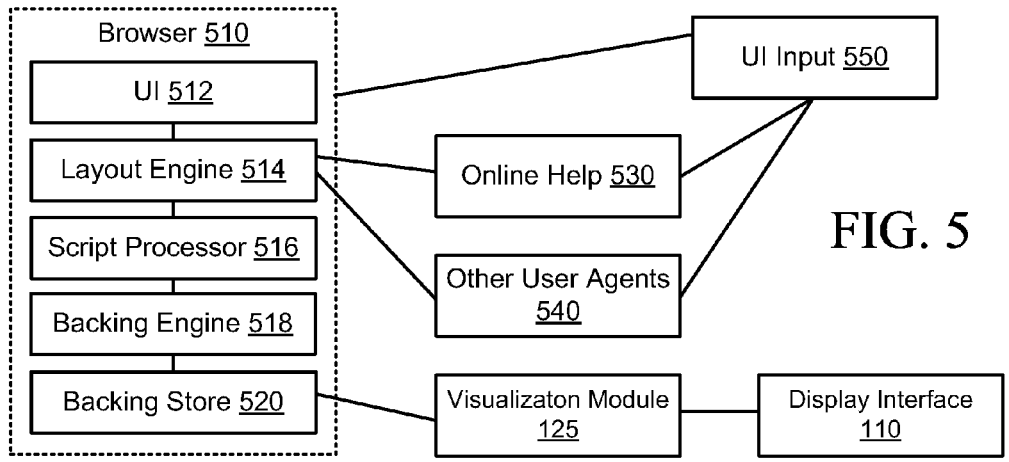
FIG. 5 is a schematic diagram of select components of the computing device of FIG. 1.

As illustrated in FIG. 5, the backing store 520 is comprised in the memory allocated to the browser 510 although in other embodiments the backing store 520 can be associated with a separate backing store application (not illustrated in FIG. 5), which executes in cooperation with the browser 510 and other applications 530, 540, 138 to stored rendered content as discussed below. The backing store 520 in this example comprises a pool of memory buffer regions, which may or may not be contiguous within one or more of the memory components of the device 100. The pool is used to store image data sets representative of portions, or "tiles", of a rendered structure document, as discussed below. The pool of memory buffer regions may thus be considered to be a pool of image tiles, available for retrieval and for processing by the visualization module 125 for output via a display interface 110. In addition, the backing store includes mapping data defining the logical position of image tiles within the content of the webpage or other document, as well as data defining the logical position of the viewport for any given main region or subregion of the document. The backing store 520 is also used as storage for browser threads and other logic executing in cooperation with the browser application 510.

Figure 6:
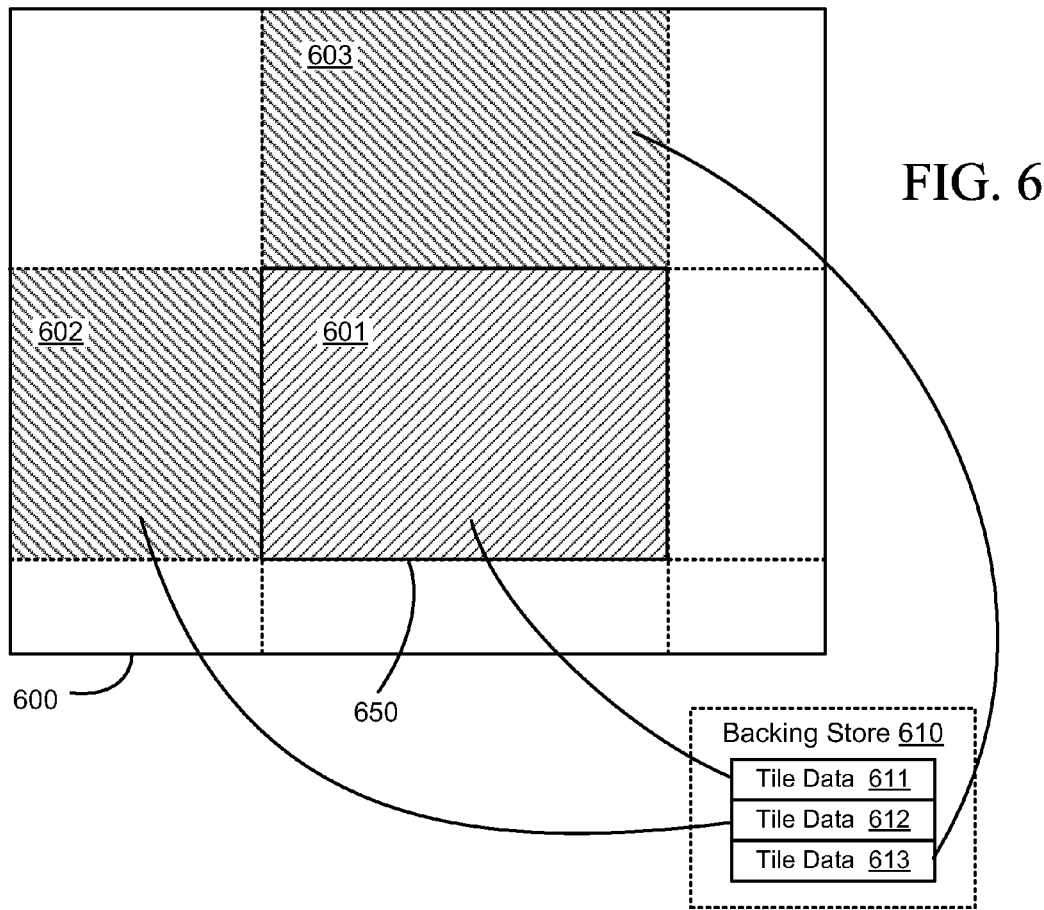
FIG. 6 is a schematic diagram illustrating the layout of tiled content and a corresponding backing store for the content of FIG. 3.

When content, such as a webpage, is to be displayed by the browser 510 or other application, the content is mapped into one or more content tile data sets. The mapping may be carried out by a separate module or process within the browser 510 or the device 100, such as the backing store engine 518, although in some embodiments this functionality is integrated in the layout engine 514. Turning to FIG. 6, a simple example is shown. The region 600 depicts the entirety of the content of a document (such as a webpage), and it is shown here subdivided into nine tiles, including specifically those tiles 601, 602, and 603. All nine tiles, some of which in this example have different dimensions, together make up the entire content 600. Each of the tiles is logically defined to represent relatively small and manageable portions of the content. While at this stage the content has been logically divided into content tile data sets, these are only defined areas for rendering and are not necessarily processed as output for display until needed.

In the example of FIG. 6, the content 600 is not divided evenly; however, in this case, complete tiles (such as 601 and 603) are defined to be the same shape and size as the current display region of the device 100, as defined by viewport 650 indicated in FIG. 6. Each of the content tile data sets may be defined with position information relating the data set's relative position within the content, for example by means of a set of offset values as well as length and width dimension, which may be expressed in units such as pixels or points. As a result of the positioning of complete tile 601, most other tiles of the content 600 are not complete. It will be appreciated by those skilled in the art that there may be variations in the designation of tiles; for example, the tiles may have a different size or proportion, and may be smaller or larger than the actual viewport 650 for that given device 100. Further, the tiles may be defined not as regular rectangular shapes, but instead as squares, hexagonal, etc. shapes.

These data sets are then rendered as image tile data sets by the layout engine 514 for storage in the image tile pool of the backing store. The image tile data sets may be formatted as bitmap images or any other suitable image type. FIG. 6 illustrates an example of a backing store 610, comprising three tiles 611, 612, 613, as well as mapping data 615 for the tiles 611, 612, 613 and data defining the position of the viewport 650. In this example, each one of these backing store tiles (i.e., records within the memory pool) comprises a tile image data set for a corresponding one of the tiles 601, 602, 603. Accordingly, rather than storing a single large image representing the entire content 600, a number of smaller image tiles are stored instead. Subsequently, when the visualization module 125 is instructed to process data for display via the display interface 110, the visualization module 125 can be assigned one or more selected image tile data sets to render rather than an entire, single large block of rendered content. These individual image tile data sets may be rendered individually.

As with the content tile data sets, the image tile data sets may be stored in association with position data and so forth so as to enable the visualization module 125 or the layout engine 514 to determine the relative position of each image tile data set with respect to the others. For example, the position data may include a coordinate location (e.g. a pixel location). In addition, each image tile data set may be associated with a flag value that is set to indicate whether the data set is "committed" (i.e., it is not necessary to further update the data set) or "uncommitted" (i.e., it is necessary to update the image tile data set). Other characteristics and parameters of the image tile data sets are described in United States Patent Application Publication No. 2010/0281402 referenced above.

It may be noted that not every content tile data set need be rendered as an image tile data set for storage in the backing store 610. In the example of FIG. 6, only three of the nine tiles has been rendered and stored in the backing store 610.

The creation and storage of the content tile data sets and image tile data sets may be executed upon receipt of an instruction to render a given webpage for display. The selection of which content tile data sets to be rendered as images and stored in the backing store 610 may be determined based on heuristics indicating which areas of the content 600 are most likely to be requested by a user for display, or based on some predictive or memory-conservation algorithm to only store those image tiles that are more likely to be rendered for display.

When the webpage is requested for display and once the image tile data sets have been stored, the relevant image tile data sets are read from the backing store 610 and processed for painting the display of the device 100.

Figure 7:
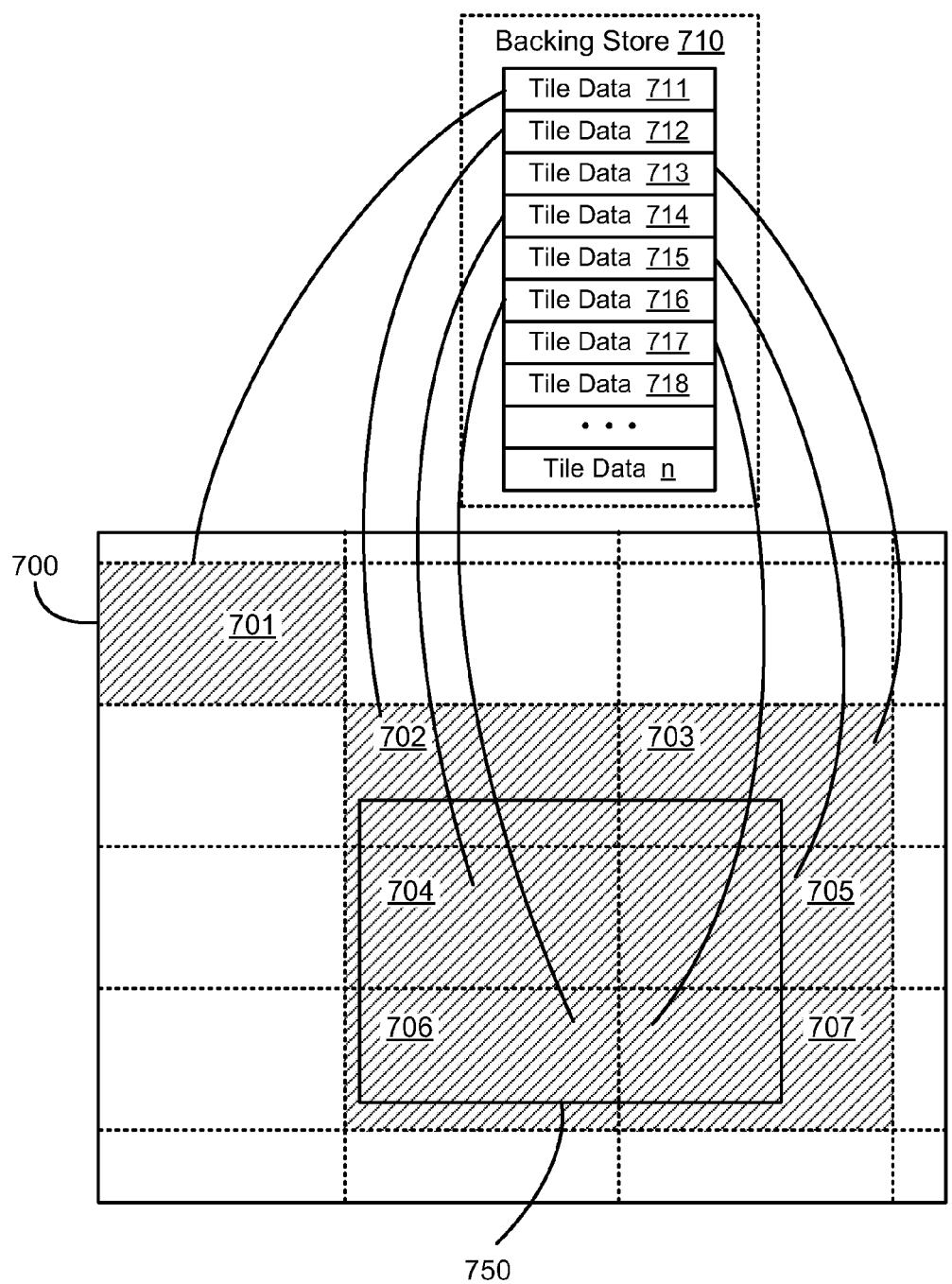
FIG. 7 is a further schematic diagram illustrating a further layout of tiled content and a corresponding backing store.

Another example of a backing store is shown in FIG. 7, which illustrates that just as the various memory buffers pooled for the backing store are not necessarily contiguous, the image tile data sets created and stored in the backing store 710 are not necessarily contiguous either. In FIG. 7, a number of smaller tiles have been defined, each of which is smaller than the viewport 750 for the device 100. In this case, those content tile data sets 702, 703, 704, 705, 706, 707 that were defined as falling in the viewport 750 have been rendered and stored in the backing store at 712, 713, 714, 715, 716, 717 respectively. In addition, one further non-contiguous tile 701 has also be rendered and stored in the backing store at 711 (the backing store in this example would also comprise mapping data for each tile, and position data for the viewport 750, not shown). This non-contiguous tile 701, it can be seen, is not required to render the viewport 750 for display at this time. Advantageously, however, every content tile data set is rendered as an image tile and stored, so as to minimize access and processing time when a request is received to scroll, zoom, or otherwise shift the webpage in the display 110. When a command to scroll, zoom, etc. is received, in response to said command, the appropriate image tile data set or sets are retrieved from the backing store 710 and provided to the visualization module 125 and processed for display, rather than requiring the visualization module 125 to completely re-process the original content 700 as an image. The backing store thus potentially reduces the amount of processing time required in rendering part of a webpage or other content for display. Further, when a particular image tile data set is no longer in use, for example because it is no longer being displayed by the device 100, that data set may be discarded and the memory freed for new data sets.

The foregoing examples provided a simple webpage document. However, the webpage may be structured to include subregions that are independently scrollable in relation to other portions of the webpage, as explained above. The subregion may be scrollable itself, and optionally be provided with user interface elements (such as scroll bars) for receiving user-input scrolling commands. Scrolling commands may be detected by other means, such as click (or tap)-and-drag actions (invoked using pointing device such as a mouse or trackpad) or swipe actions (invoked using a touchscreen display interface).

Figure 8:
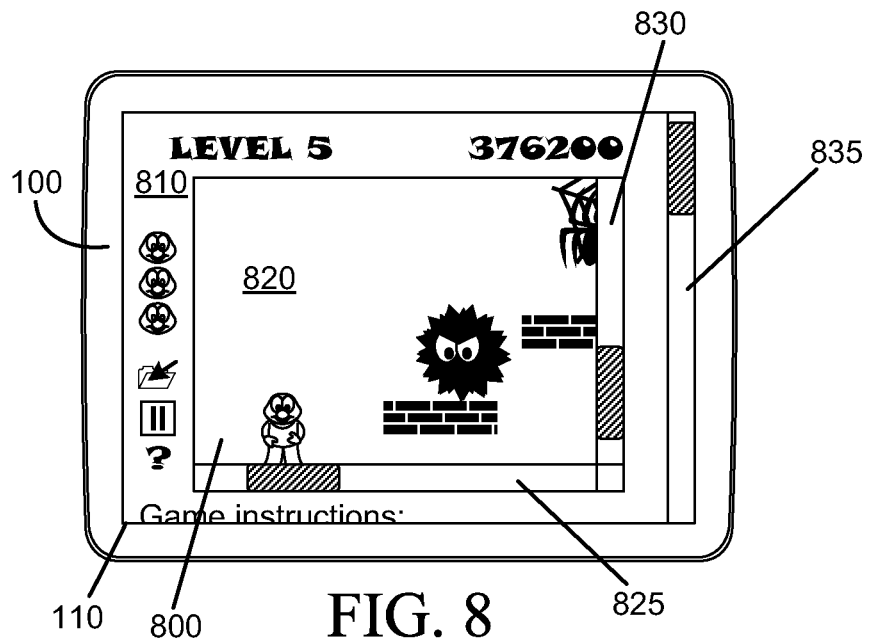
FIG. 8 is an illustration of a main region and a subregion displayed in viewports in a display interface.

FIG. 8 illustrates a computing device 100 displaying a two-region webpage 800 in its display interface 110. A first, scrollable main region (the main page or main frame) 810 surrounds a second, scrollable subregion 820. Each of the main and scrollable regions 810, 820 may comprise HTML elements such as images, hyperlinks, and the like. The scrollable subregion 820 in this example is displayed within a defined area of the main region 810 provided with scrollbars 825, 830 for navigating in the horizontal and vertical directions, respectively. Similarly, the scrollable main region is also provided with a scrollbar 835. The position of the subregion 820, its dimensions, and the presence of scrollbars may be defined within the code for the main region 810 itself or in a separate file. As before, the content of the scrollable subregion 820 can be defined either within the structured document itself (e.g., within the webpage, within a defined container (<div>) or other block-level element) is optionally defined using a separate resource (e.g., another HTML document) from the webpage defining the main region 810. In other examples, the subregion 820 itself may not be scrollable, but may contain content that dynamically or asynchronously changes with respect to the main region 810. As noted above, the content may be video content; the subregion containing video content would be frequently updated as the video is played back in the display interface 110

Figure 9:
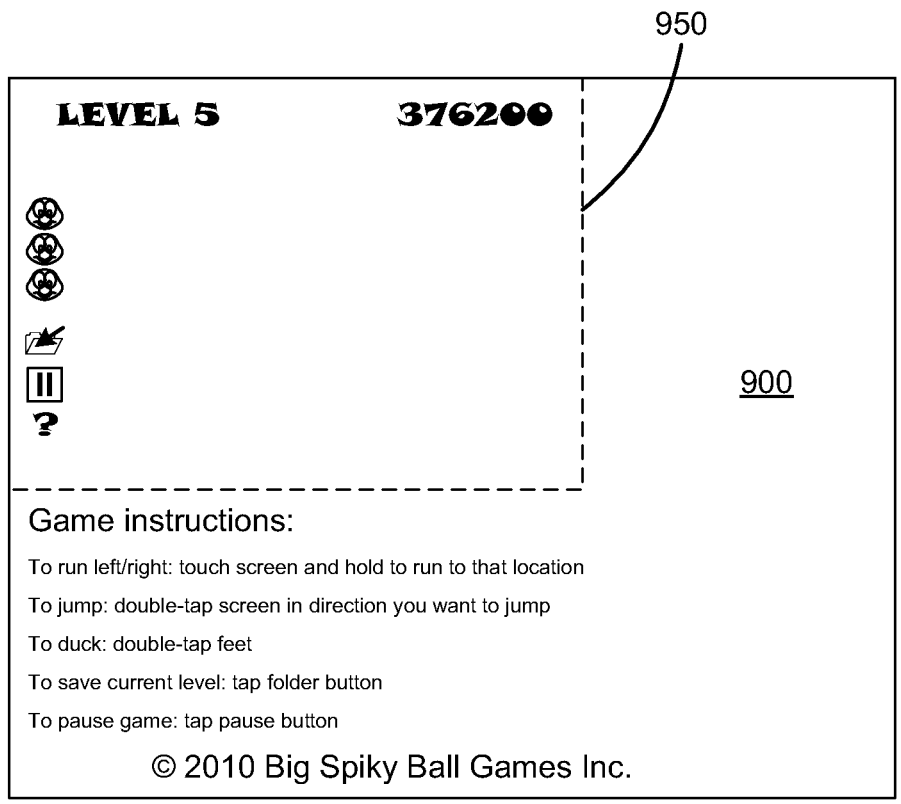
FIG. 9 is an illustration of content of the main region shown in FIG. 8.

In the example of FIG. 8, the complete content of the scrollable subregion 820 comprises the content 300 illustrated in FIG. 3, while the content of the main region 810 is illustrated in FIG. 9. As can be seen in FIG. 9, the total renderable content 900 of the main region 810 extends beyond the display region of the device 100. The portion of the content 900 that is currently displayed in FIG. 8 (i.e., the viewport) is indicated at 950.

Thus, it is possible for the content of the subregion 820 to be scrolled independently of the main region 810, and vice versa. Typically, when a scroll or zoom event is detected in respect of the subregion 820, the entire subregion must be re-rendered and displayed each time such an event is processed. This results in excess computational cycles and potentially consumption of additional memory, since the rendered subregion must be stored in addition to any parts of the main region that were already rendered and stored.

Figure 10:
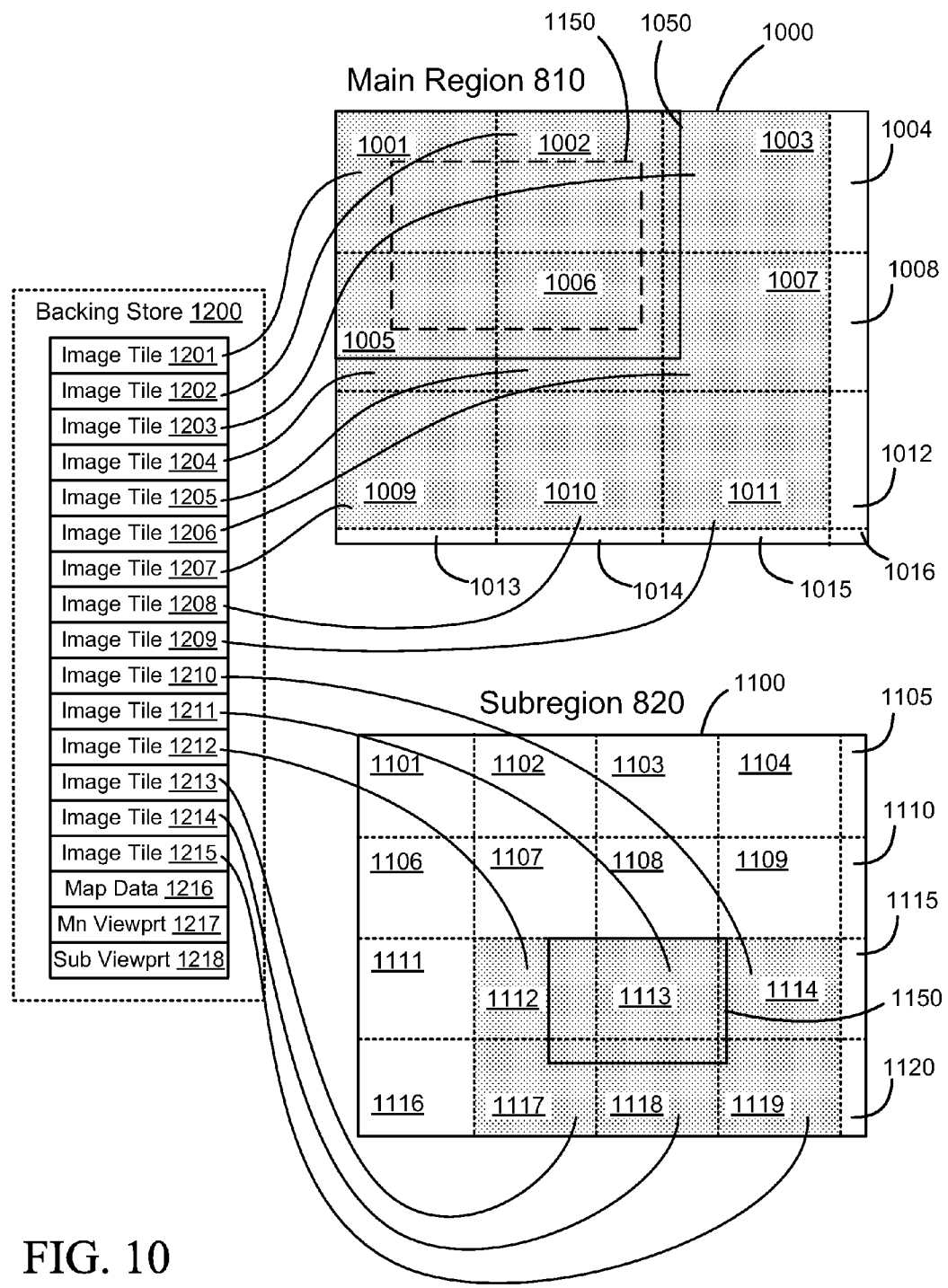
FIG. 10 is a schematic diagram illustrating the layout of tiled content for the main region and subregion of FIG. 8 and a corresponding backing store.

Accordingly, turning to FIG. 10, when the webpage 800 is initially rendered for display, the content of the main region 810, indicated at 1000, is mapped into one or more content tile data sets 1001, 1002 . . . 1016 as illustrated. In this example, the tiles are logically defined as having a length and width smaller than the viewport 1050 for the main region, although as noted previously the tiles may be defined to have a size and shape that matches the viewable area, here indicated as 1050. As described above, the definition of content tile data sets at this stage does not result in the rendering of every such data set as an image tile data set for storage in the backing store. In this example, it can be seen that only content tiles 1001, 1002, 1005, and 1006 intersect the viewport 1050; accordingly, in one embodiment only those tiles need be rendered as image tile data sets for storage in the backing store 1200. However, in a further embodiment, when this particular region 810 is the active region (i.e., user action or commands are detected in respect of this region), all content tile data sets are rendered as image tile data sets and stored in the backing store 1200, even if rendering of every image tile is not required. If this region 810 was not the active region, then only those content tile data sets sufficient to cover the viewport 1050 (i.e., those content tile data sets intersecting the viewport 1050) need be rendered as image tile data sets and stored in the backing store 1200.

At the same time, the subregion 820 of FIG. 8 is to be rendered as well. The viewport 1150 of the subregion 820 is superimposed over the viewport 1050 of the main region 810 as shown in FIG. 10, although the viewport 1150 may contain different content than the main viewport 1050. The content 1100 of this subregion 820 is also mapped to one or more content tile data sets 1101, 1102.1120 as shown in FIG. 10, for a total of twenty tiles. However, it can be seen that the actual content to be initially displayed (i.e., the content within the viewport 1150) only covers parts of six such tiles; accordingly, only those content tiles intersecting the subregion viewport 1150, which are 1112, 1113, 1114, 1117, 1118 and 1119, are rendered as image tile data sets and stored in the backing store 1200, since in this example the subregion is not the active region in the webpage at this time. The image tile data sets thus generated are stored in the same backing store 1200 as that used for the image tile data sets of the main region 1000. As before, the backing store 1200 comprises mapping data 1216 for each of the image tiles stored therein (both for the main region 810 and the subregion 820), as well as position data 1217, 1218 for both the main viewport 1050 and the subregion viewport 1150, respectively.

Once at least the image tile data sets intersecting the viewports 1050, 1150 have been rendered, those image tile data sets corresponding to the viewports 1050, 1150 are then processed for output to the display interface 110. Those image tile data sets that have been rendered in the backing store 1200 may have their flags set to "committed", indicating that no further update of the tile content is required.

By utilizing the same pool of image tiles in the backing store for storing both regions' image tile data sets, memory consumption is reduced as compared to the creation of a separate data repositories for each subregion found in the webpage. It may be noted that FIG. 8 illustrated a webpage 800 having only two regions: a main region or main frame, and a second region or subregion that is independently scrollable within the main region. It will be appreciated by those skilled in the art that the webpage 800 may contain more that two regions; for example, there may be one main and two subregions, or indeed any number of regions. The foregoing mapping of content to content tile data sets, and the rendering of selected content tile data sets to image tile data sets, would then be carried out in respect of each one of these regions. If an additional data repository were created for each region or subregion found in the webpage, the additional overhead in memory consumption may be detrimental to the operation of the device 100. Indeed, if a third party webpage to be rendered at the device 100 contained a large number of independently scrollable subregions, the creation of a separate repository for each one of those subregions would be prohibitive, memory-wise. Therefore, in these embodiments, a single tile pool is allocated to store the image tile data sets for the main region and every subregion, thus avoiding the penalty incurred by creating separate data repositories for every region or subregion in the webpage.

These embodiments may be implemented with different types of backing stores, such as synchronous, asynchronous, and multithreaded backing stores. The foregoing mapping and rendering is advantageously executed using a multi-threaded process responsive to the detection of user inputs (such as scrolling). An example of such a multithreaded process is described in U.S. patent application Ser. No. 12/985,338, filed 5 Jan. 2011 and entitled "Processing User Input Events in a Web Browser".

As described above, the single backing store 1200 at the device 100 currently stores tile image data for both the main region 810 and subregion 820, for a total of fifteen image tile data sets; within the backing store, image tiles 1201 through 1209 of the image tile pool in the backing store 1200 store the image tile data sets for the main region 810, while image tiles 1210 through 1215 store the image tile data sets for the subregion 820. Since the image tile pool of the backing store 1200, and the backing store 1200 itself, may have a finite size, tiles within the pool may be reused to accommodate changes to the set of rendered tiles for the main and/or subregions in response to actions such as scrolling or zooming, or changes to the content of the main or subregion due to animations, video playback, and the like.

Figure 11:
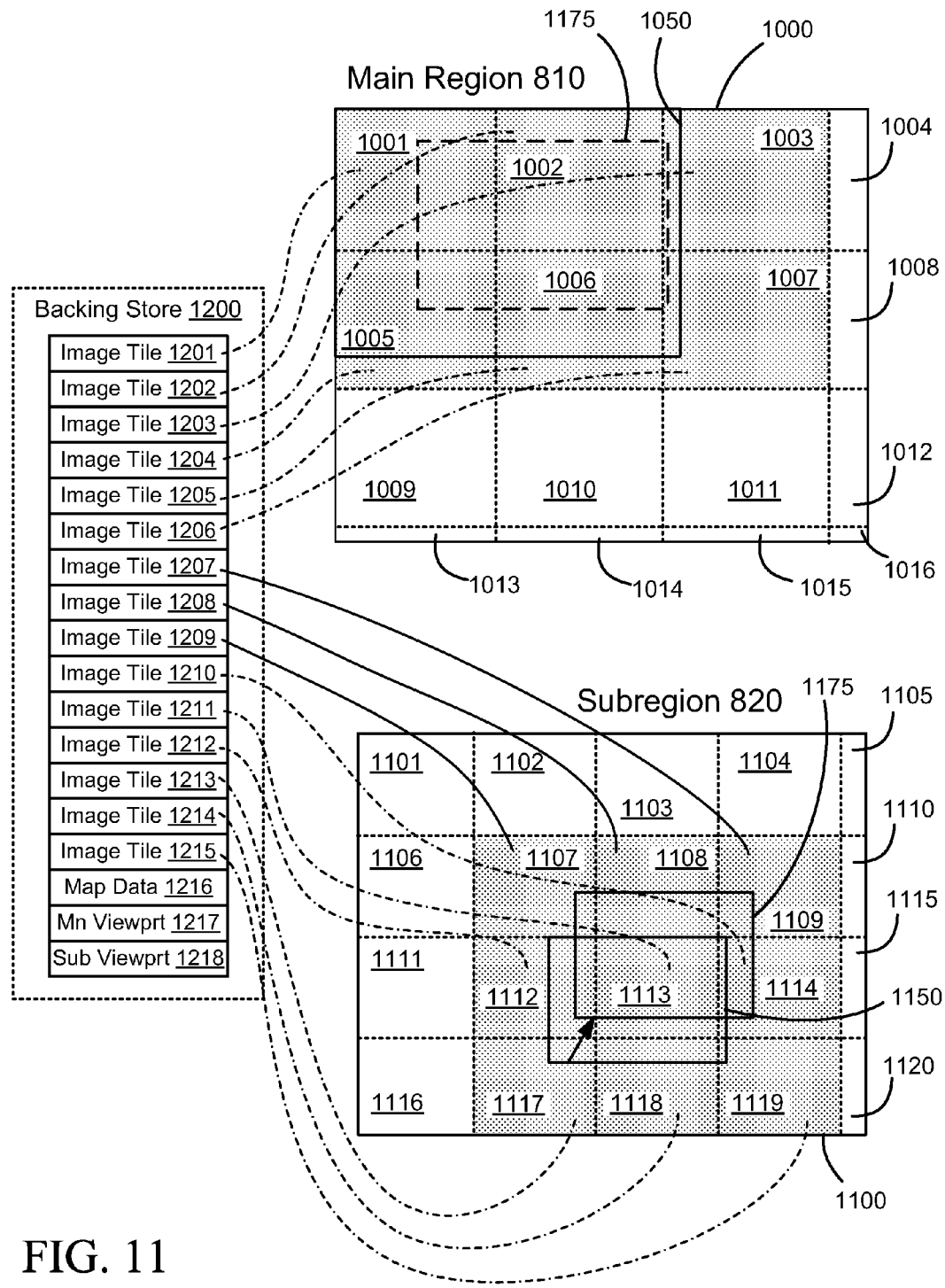
FIG. 11 is a further schematic diagram illustrating the tiled content and corresponding backing store of FIG. 10 after detection of a viewport change.

Turning to FIG. 11, the subregion 820, which was not the active region in FIG. 10, may subsequently gain focus or be activated. This activation may occur in response to a user action, such as a scrolling command applied to the subregion 820, or it may be programmatically activated (for example, as a result of an executed script). FIG. 11 illustrates a possible offset resulting from a detected scrolling command, in which the viewport 1150 is effectively moved to a new position at 1175, which, it can be seen, intersects a different set of content tile data sets 1107, 1108, 1109, 1112, 1113, and 1114. As a result, further content tile data sets 1107, 1108, 1109 will be rendered as image tile data sets, and the rendering of the subregion 820 within the main region 810 will be updated.

Thus, as shown in FIG. 11, a further three content tile data sets 1107, 1108, 1109 of the subregion 820 have been rendered as image tile data sets. Because the image tile pool in the backing store 1200 was filled in the initial rendering, to accommodate the newly rendered image tile data sets, selected existing image tile data sets are replaced or overwritten with the newly rendered image tile data sets. The backing store engine may select those image tile data sets associated with a non-active region—in this case, the main region—and overwrite or delete those tiles that are not currently displayed, i.e. that do not intersect the viewport 1050. In this case, the tiles 1009, 1010, and 1011 are removed, thus freeing tiles 1207, 1208 and 1209 in the image tile pool of the backing store 1200. This newly available storage space is then used to store the image tile data sets corresponding to 1109, 1108 and 1107 of the subregion 820. In FIG. 11, the association between the backing store tiles and the image tile data sets is illustrated in dashed lines for those associations that have not changed from the associations illustrated in FIG. 10, while the solid line associations represent those associations that have changed in FIG. 11.

If, on the other hand, the image tile pool or backing store 1200 is not at capacity, the additional tiles may simply be stored in available space in the image tile pool. In other words, when there is insufficient space in the tile pool, those image tile data sets that are considered to be the "lowest" priority are removed from the backing store 1200: the image tile data sets that are overwritten are those data sets corresponding to an inactive region (in this case, the main region 810) and that do not currently form part of the display of the webpage 800. Thus, the backing store engine 618 may identify every image tile data set for an inactive region that does not intersect its corresponding viewport, and delete those data sets. In some embodiments, only sufficient image tile data sets are deleted to make room for the newly created image tile data sets.

Figure 12:
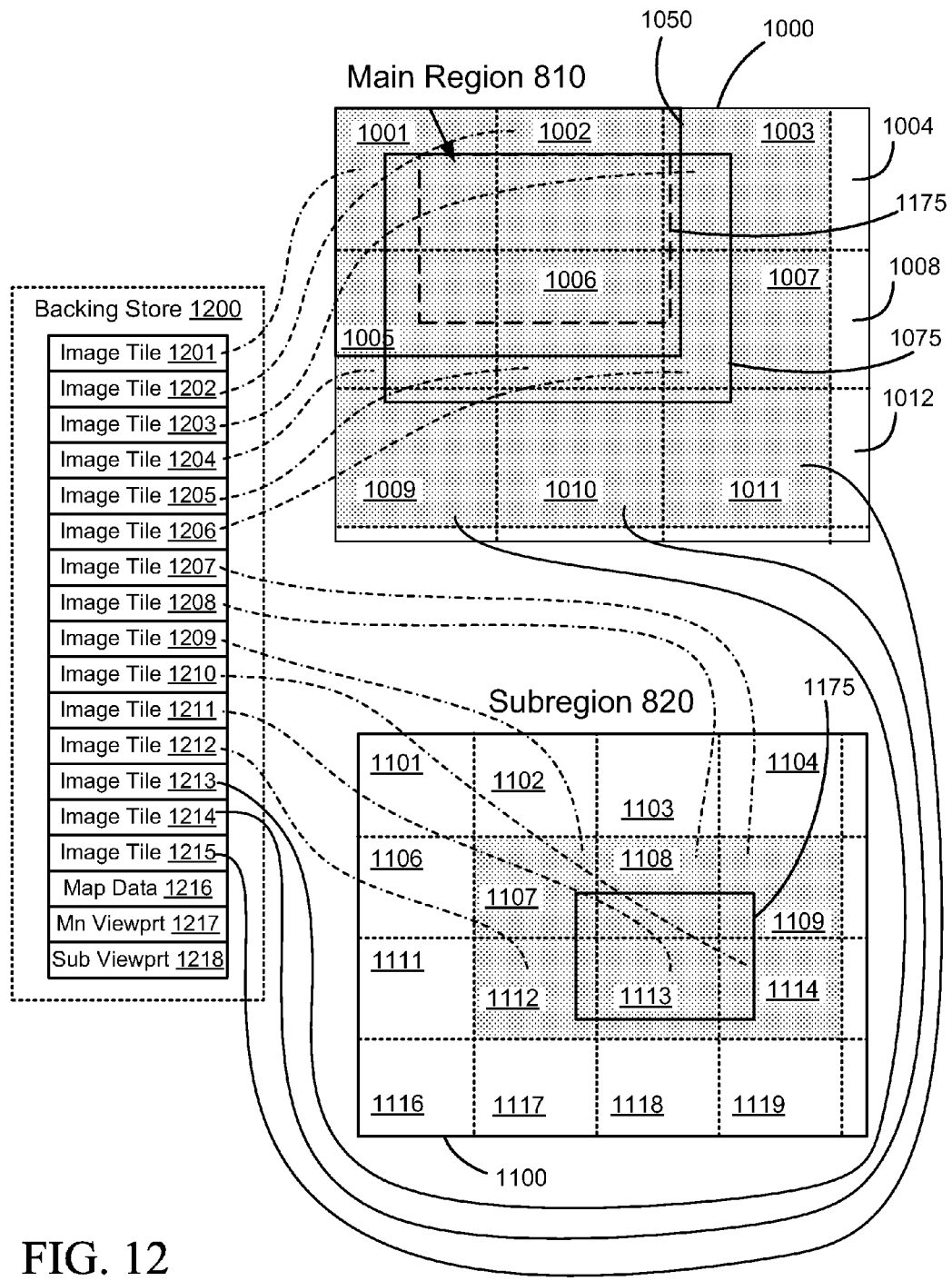
FIG. 12 is still a further schematic diagram illustrating the tiled content and corresponding backing store of FIG. 10 after detection of a further viewport change.

FIG. 12 illustrates the management of the backing store 1200 and its image tile pool when the main region 810 is again made active, and its content is scrolled to effectively shift the viewport to intersect another set of tiles. In this example, the viewport 1050 has been moved to a new location 1075, where it now intersects content tile data sets 1001, 1102, 1003, 1005, 1006, 1007, 1009, 1010 and 1011—a total of nine tiles. Each of these content tile data sets are rendered as image tile data sets. Again, however, since the image tile pool no longer has available storage space for the three additional tiles, the backing store engine 618 releases selected tiles associated with the inactive region—the subregion 820—that do not intersect the current subregion viewport 1175. In this case, the tiles to be released correspond to the tiles 1213, 1214 and 1215 in the backing store 1200. They are replaced with the newly rendered tiles of the main region, 1009, 1010 and 1011. Again, the lines in FIG. 12 representing the changed associations are shown in solid lines, where those associations remaining unchanged from FIG. 11 are shown in dashed lines. In both the examples of FIGS. 11 and 12, the mapping data 1216 and viewport data 1217, 1218 are updated as necessary.

Figure 13:
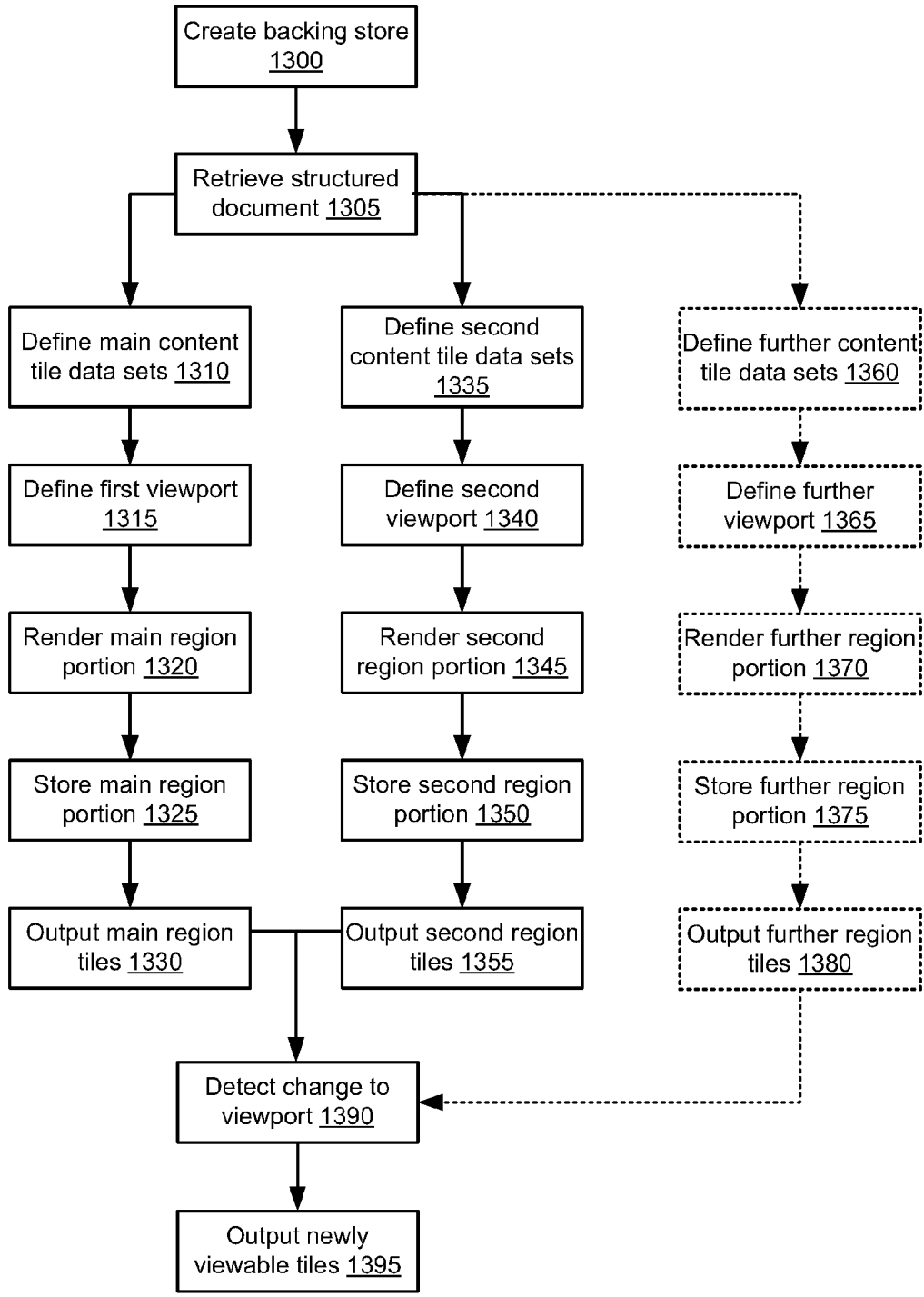
FIG. 13. is a flowchart depicting a process for rendering, storing and outputting main region and subregion content.
Figure 14:
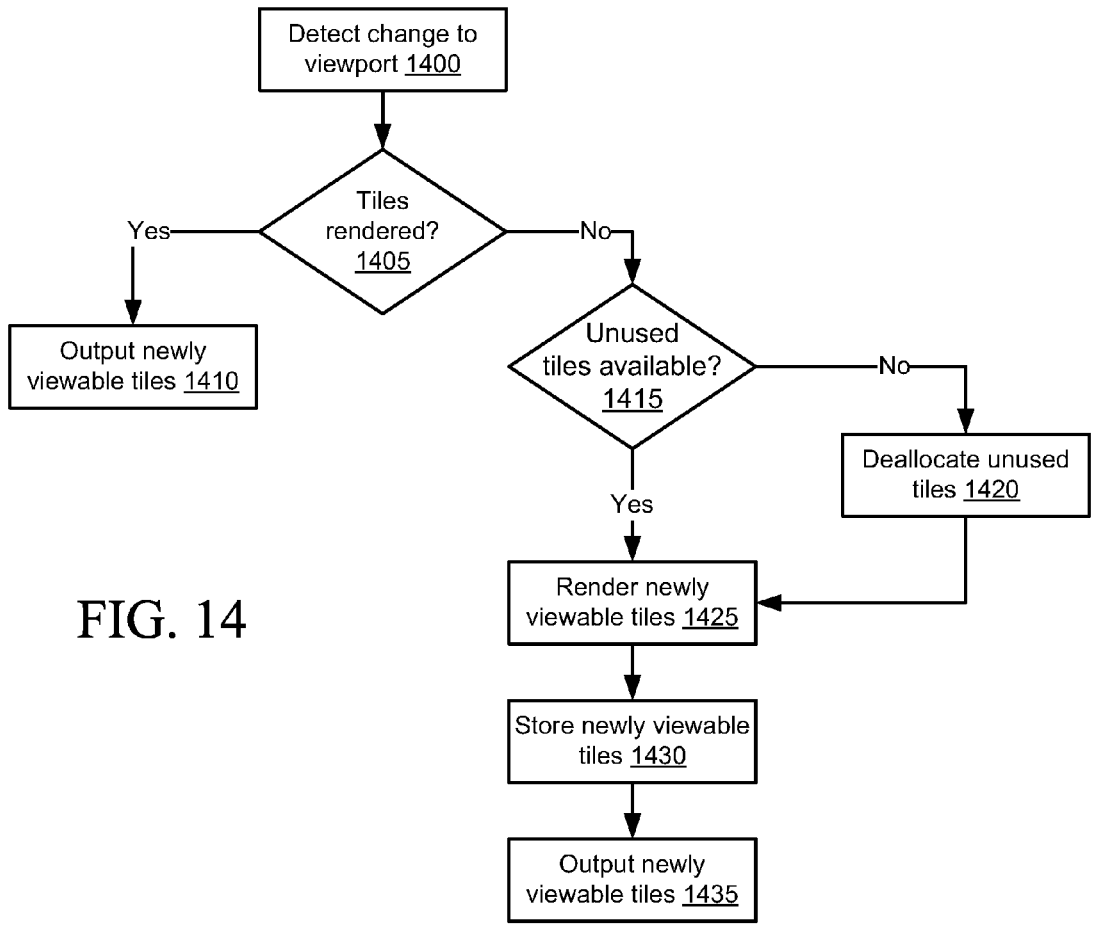
FIG. 14 is a flowchart depicting a process for rendering and outputting tiles in response to a detected viewport change.
Figure 15:
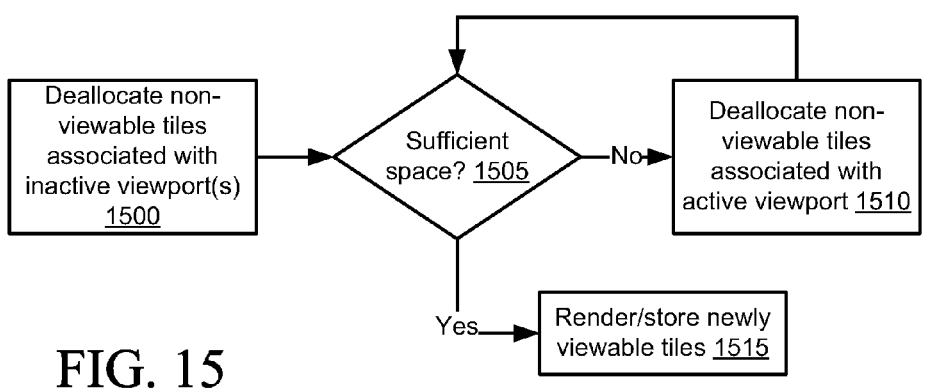
FIG. 15 is a flowchart depicting a process for deallocating space in a backing store for storing newly generated tiles.

A process by which the backing store memory allocation is managed is illustrated in FIGS. 13 through 15. Turning first to FIG. 13, at 1300 a backing store is created in memory at the device 100, generally in volatile memory 106. The amount of memory allocated at this stage can be of a fixed capacity. Allocation of memory 106 for the backing store can be carried out upon system bootup, or more typically upon launch of the browser application or other application used to render the structured document, or alternatively upon retrieval of a given structured document for rendering at 1305. The structured document may be retrieved from a local data store at the device 100, or received over a network such as the public or private network 224 of FIG. 2, from a server or content source such as the host system 250 or HTTP server 279.

Upon receipt of the structured document, the document is then processed in order to define the main content tile data sets at 1310. The processes can include those known in the art, such as translation of the structured document based on content and style information. For example, a first process may convert the content of the document to a content model or node tree such as a Document Object Model (DOM) tree. The conversion of the document to a node tree can be carried out in chunks as the document is received or retrieved. A second process converts the node tree, in combination with any available style information, to a render tree which comprises a hierarchy of document elements assigned their appropriate visual attributes (e.g., colour and dimension), in the order in which they are presented when displayed. The render tree can then be processed to determine the layout of each element in the document. Where the document contains multiple regions (e.g., a main region and a subregion), the node tree will have different branches or subbranches for each such region. The subregions of a document may not be provided directly in the structured document itself; they may be linked to the document instead, for example with a hyperlink reference. The style information may be present within the structured document itself or stored in a separate field linked to the document. The processed content is divided into content tile data sets in 1310.

At 1315, if not already carried out previously, the first viewport associated with the main region represented in the node tree is defined. At that point, those content tile data sets intersecting the first viewport can be identified, and only those data sets are rendered as a viewable image and stored as corresponding image tile data sets at 1320. Of course, more than only those content tile data sets intersecting the first viewport may be rendered. At 1325, at least the image tile data sets thus rendered are stored in the backing store. A fixed number of tiles in the pool of tiles in the backing store may be allocated to the image tile data sets of the main region; this allocation can take place initially at 1300, or else can occur once the image tile data sets are generated at 1320. The rendered image tile data sets of the main region can then be output for display on a display interface, which can be integral with or external to the computing device 100, at 1330.

A similar process is undertaken for the subregions within the structured document, which is illustrated in the branch 1335 . . . 1355 for a second content tile data set and second image tile data set for a first subregion, and in the branch 1360 . . . 1380 for a further content tile data set and further image tile data set for a further subregion. At 1335 or 1360, the second or further content tile data sets are defined in a manner similar to that for the main region, in which the document is processed and a node and render tree generated and used to define the data sets. At 1340 or 1365, the second or further viewports are defined. At 1345 or 1370, at least the content tile data sets intersecting the second or further viewport, respectively, are rendered to produce image tile data sets, and then they are stored in the backing store at 1350 or 1375. Again, the number of tiles for storing the image tile data sets may be allocated at this stage, or earlier. The image tile data sets corresponding to the currently viewable area of the document (i.e., the second or further viewport) are then output for display at 1355 or 1380.

These processes for each of the main and subregions may be carried out sequentially in a single thread or process, or at least partially in parallel in a multi-threaded environment. As noted above, select acts in the processes may be carried out in a different order than indicated in FIG. 13; further, it is possible that processing of the image tile data sets for a subregion may be completed before a further subregion or before the main region is completed. However, the image tile data sets for the various main and subregions are stored in the same backing store, rather than necessarily allocating memory for further backing stores and processes.

Once the image tile data sets are displayed, a change to a viewport (the first, second or further viewport) may be detected at 1390. The change may be invoked by a detected instruction due to interaction of a user interface element—for example, a scroll or zoom command, whether invoked via a scrollbar graphical user interface element or a touch or gesture on a touchscreen interface. The viewport in which this change is detected is typically the active viewport, since the interaction was detected in respect of that viewport. In response to this instruction, the position of the active viewport is recomputed, and image tiles that intersect with the repositioned viewport are output for display at 1395.

If the image tiles needed for the new output at 1395 are already in the backing store, then these tiles are simply retrieved and displayed; however, because the backing store was defined with a finite capacity, the needed image data may not be already available. Thus, a process such as that shown in 1400 is carried out.

At 1400, the change to the active viewport is detected. At 1405 it is determined whether image tile data sets corresponding to the new area covered by the active viewport are already in the backing store. If they are, then the image tiles are output at 1410. If the needed image tile data sets are not already stored in the backing store, then at 1415 it is determined whether there is capacity to store the required tiles. If not, at 1420 sufficient tiles are deallocated as explained below with reference to FIG. 15. When space is thus freed for the additional image tiles required for the active viewport (e.g. the viewport associated with the main region), however, it will be appreciated that image tiles for the other viewport or viewports (e.g. the second viewport associated with the first subregion, or a third viewport associated with a further subregion) may still be retained in the backing store.

At 1425, the image tile data sets for those tiles intersecting the altered viewport are rendered, then stored in the newly deallocated space in the backing store at 1430. The viewport displayed in the display interface is then updated at 1435, with the newly rendered tiles being output for display.

Deallocation of tiles in the backing store may be carried out in the manner illustrated in FIG. 15. When it is determined that tiles in the pool of tiles allocated in the backing store are to be deallocated, first those tiles storing image data for the non-active viewport or viewports that is currently not being displayed are deallocated at 1500. Thus, those image tiles for the non-active viewports that are currently being displayed remain in the backing store. At 1505 it is determined whether sufficient space has been freed for the newly rendered image tiles generated for the active viewport. If not, then those image tiles associated with the active viewport that are not currently being displayed are removed as well at 1510. If there is then sufficient space to store the newly rendered tiles, at 1515 those tiles are then rendered and stored.

It can be seen from the foregoing that when new image tile data sets are generated, necessitating deletion of previously generated image tile data sets from the backing store, precedence is given to those image tile data sets in the backing store that correspond to the currently active region of the webpage being displayed (i.e. intersecting the viewport), whether that active region is a main region or frame, or a subregion. It may be presumed that since the active region is the region that is most likely to receive a further user action, its image tile data sets should be preserved in the backing store for further use, for example in the event a further scroll command is detected necessitating rendering of those tiles. Retaining the active region's image tile data sets over the image tile data sets of an inactive region is thus most likely to improve the response time in the event a further scroll command is detected. Of course, if the backing store has sufficient capacity to store all the image tile data sets for all regions of the webpage 800, then there is no need to delete any of the existing image tile data sets. If the backing store has sufficient capacity to retain at least some of the non-intersecting image tile data sets of the inactive region, an algorithm may be implemented to determine which of the non-intersecting tiles may be retained; for example, those tiles that are considered most likely to be re-displayed (e.g., in response to a further scrolling action) are retained, while those positioned furthest from the current position of the viewport are deleted.

The systems and methods disclosed herein are presented only by way of example and are not meant to limit the scope of the subject matter described herein. Other variations of the systems and methods described above will be apparent to those in the art and as such are considered to be within the scope of the subject matter described herein. For example, it should be understood that steps and the order of the steps in the processing described herein may be altered, modified and/or augmented and still achieve the desired outcome. Throughout the specification, terms such as "may" and "can" are used interchangeably and use of any particular term should not be construed as limiting the scope or requiring experimentation to implement the claimed subject matter or embodiments described herein.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. Various functional units described herein have been expressly or implicitly described as engines, modules or applications, in order to more particularly emphasize their potentially independent implementation and operation, but these terms are used interchangeably unless otherwise specified. It is also noted that an engine, application, module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The various functional units may be implemented in hardware circuits comprising custom VLSI circuits or gate arrays; field-programmable gate arrays; programmable array logic; programmable logic devices; commercially available logic chips, transistors, and other such components. Modules implemented as software for execution by a processor or processors may comprise one or more physical or logical blocks of code that may be organized as one or more of objects, procedures, or functions. The modules need not be physically located together, but may comprise code stored in different locations, such as over several memory devices, capable of being logically joined for execution. Modules may also be implemented as combinations of software and hardware, such as a processor operating on a set of operational data or instructions.

A portion of the disclosure of this patent document contains material which is or may be subject to one or more of copyright, design patent, industrial design, or unregistered design protection. The rightsholder has no objection to the reproduction of any such material as portrayed herein through facsimile reproduction of the patent document or patent disclosure, as it appears in the Patent and Trademark Office patent file or records, but otherwise reserves all rights whatsoever.

The invention claimed is:

1. A method in an electronic device for processing a structured document including at least a main region and a subregion within the main region, the method comprising:
    creating a backing store for storing rendered content in memory of the electronic device, the backing store including an available pool of tiles for storing image data;
    rendering, as main rendered image data, at least a portion of the main region associated with a first viewport;
    rendering, as second rendered image data, at least a portion of the subregion associated with a second viewport;
    allocating, from the available pool of tiles, a first subset of tiles for storing the main rendered image data and a second subset of tiles for storing the second rendered image data;
    storing the main rendered image data in the first subset of tiles;
    storing the second rendered image data in the second subset of tiles;
    outputting, to a display interface, viewable portions of selected tiles from the first subset of tiles and the second subset of tiles that are within the first viewport and the second viewport;
    in response to a change in either the first viewport or the second viewport, when it is determined that rendered image data required for the changed viewport is not stored in the subset of tiles corresponding to the changed viewport and a quantity of unused tiles in the available pool of tiles is insufficient to store the required rendered image data,
        deallocating, from an other subset of tiles, tiles storing rendered image data not currently being displayed in the other viewport;
        reallocating the deallocated tiles to the subset of tiles corresponding to the changed viewport; and
        storing the required rendered image data in the reallocated tiles; and
    outputting viewable portions of newly viewable tiles of the subset of tiles corresponding to the changed viewport.

2. The method of claim 1, wherein the subregion includes content that is larger than a size of the second viewport.

3. The method of claim 1, wherein the available pool of tiles is filled by storing the main rendered image data in the first subset of tiles and storing the second rendered image data in the second subset of tiles.

4. The method of claim 3, wherein when if a user interface of the electronic device is interacting with the subregion, allocating the second subset of tiles for storing the second rendered image data includes allocating unused tiles from the available pool of tiles.

5. The method of claim 3, further comprising:
    maintaining the allocation of those tiles of the first subset of tiles storing main rendered image data currently being displayed in the first viewport when allocating the second subset of tiles for the second rendered image data.

6. The method of claim 1, wherein the main rendered image data comprises at least a portion of the main region extending beyond the first viewport associated with the structured document.

7. The method of claim 1, wherein the main region is scrollable relative to the viewable area of the display interface, the method further comprising:
    in response to a scroll instruction associated with the main region, outputting a different newly displayed portion of the main rendered image data.

8. The method of claim 1, wherein creating the backing store includes an operation of:
    allocating a fixed amount of memory of the electronic device as the backing store.

9. The method of claim 1, further comprising:
    rendering, as third rendered image data, at least a portion of a further subregion associated with a third viewport; and
    storing the third rendered image data in a third subset of tiles from the available pool of image tiles in said backing store.

10. The method of claim 9, further comprising:
    maintaining at least a portion of the first subset of tiles in the backing store when storing the third rendered image data in the third subset of tiles.

11. The method of claim 1, wherein the structured document is a first structured document and the subregion comprises a second structured document that is linked by the first structured document.

12. The method of claim 1, further comprising:
    creating a render tree from the block-level elements in the structured document;
    wherein said operations of rendering comprise rendering block-level elements from the render tree that are associated with the main region or subregion, respectively.

13. An electronic device comprising:
a display interface;
memory;
a processor configured to process a structured document including at least a main region and a subregion within the main region by:
creating a backing store for storing rendered content in memory of the electronic device, the backing store including an available pool of tiles for storing image data;
rendering, as main rendered image data, at least a portion of the main region associated a first viewport;
rendering, as second rendered image data, at least a portion of the subregion associated a second viewport;
allocating, from the available pool of tiles, a first subset of tiles for storing the main rendered image data and a second subset of tiles for storing the second rendered image data;
storing the main rendered image data in the first subset of tiles;
storing the second rendered image data in the second subset of tiles;
outputting, to the display interface, viewable portions of selected tiles from the first subset of tiles and the second subset of tiles that are within the first viewport and the second viewport;
in response to a change in either the first viewport or the second viewport, when it is determined that rendered image data required for the changed viewport is not stored in the subset of tiles corresponding to the changed viewport and a quantity of unused tiles in the available pool of tiles is insufficient to store the required rendered image data,
deallocating, from an other subset of tiles, tiles storing rendered image data not currently being displayed in the other viewport;
reallocating the deallocated tiles to the subset of tiles corresponding to the changed viewport; and
storing the required rendered image data in the reallocated tiles; and
outputting viewable portions of newly viewable tiles of the subset of tiles corresponding to the changed viewport.

14. The electronic device of claim 13, wherein the display interface comprises one of a display apparatus of the electronic device, an interface to an external display apparatus, and a touchscreen display.

15. The electronic device of claim 13, wherein when a user interface of the electronic device is interacting with the subregion, allocating the second subset of tiles for storing the second rendered image data includes allocating unused tiles from the available pool of tiles for storing the second rendered image data.

16. The electronic device of claim 13, wherein the main region is scrollable relative to the viewable area of the display interface, and the processor is further configured to process the structured document by, in response to a scroll instruction associated with the main region, outputting a different newly displayed portion of the main rendered image data.

17. The electronic device of claim 13, wherein the creating the backing store comprises allocating a fixed amount of memory of the electronic device for the backing store.

18. A computer program product comprising a non-transitory computer-readable medium bearing code which, when executed by an electronic device, causes said device to carry out the method of:
creating a backing store for storing rendered content in memory of the electronic device, the backing store including an available pool of tiles for storing image data;
rendering, as main rendered image data, at least a portion of the main region associated with a first viewport;
rendering, as second rendered image data, at least a portion of the subregion associated with a second viewport;
allocating, from the available pool of tiles, a first subset of tiles for storing the main rendered image data and a second subset of tiles for storing the second rendered image data;
storing the main rendered image data in the first subset of tiles;
storing the second rendered image data in the second subset of tiles;
outputting, to a display interface, viewable portions of selected tiles from the first subset of tiles and the second subset of tiles that are within the first viewport and the second viewport;
in response to a change in either the first viewport or the second viewport, when it is determined that rendered image data required for the changed viewport is not stored in the subset of tiles corresponding to the changed viewport and a quantity of unused tiles in the available pool of tiles is insufficient to store the required rendered image data,
deallocating, from an other subset of tiles, tiles storing rendered image data not currently being displayed in the other viewport;
reallocating the deallocated tiles to the subset of tiles corresponding to the changed viewport; and
storing the required rendered image data in the reallocated tiles; and
outputting viewable portions of newly viewable tiles of the subset of tiles corresponding to the changed viewport.

* * * * *